(12) United States Patent
Condo et al.

(10) Patent No.: US 11,987,724 B2
(45) Date of Patent: *May 21, 2024

(54) TRANSPARENT ELASTOMERIC NANOCOMPOSITE BLENDS

(71) Applicant: 3M INNOVATIVE PROPERTIES COMPANY, St. Paul, MN (US)

(72) Inventors: Peter D. Condo, Lake Elmo, MN (US); D. Scott Thompson, Bayport, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 514 days.

This patent is subject to a terminal disclaimer.

(21) Appl. No.: 17/264,002

(22) PCT Filed: Jul. 29, 2019

(86) PCT No.: PCT/IB2019/056443
§ 371 (c)(1),
(2) Date: Jan. 28, 2021

(87) PCT Pub. No.: WO2020/026113
PCT Pub. Date: Feb. 6, 2020

(65) Prior Publication Data
US 2021/0292598 A1 Sep. 23, 2021

Related U.S. Application Data

(60) Provisional application No. 62/711,891, filed on Jul. 30, 2018.

(51) Int. Cl.
*C09D 183/16* (2006.01)
*B82Y 30/00* (2011.01)
(Continued)

(52) U.S. Cl.
CPC ............ *C09D 183/16* (2013.01); *C07F 7/081* (2013.01); *C09D 1/04* (2013.01); *C09D 7/67* (2018.01);
(Continued)

(58) Field of Classification Search
CPC ....................................................... G02B 1/14
See application file for complete search history.

(56) References Cited

U.S. PATENT DOCUMENTS 3,454,676 A 7/1969 Busse
3,819,768 A 6/1974 Molitor
(Continued)

FOREIGN PATENT DOCUMENTS

JP 2004-155942 6/2004
WO WO 2003-094256 11/2003
(Continued)

OTHER PUBLICATIONS

Silane Coupling Agents, Dec. 1, 2012, XP05564051.
(Continued)

*Primary Examiner* — Michael F Pepitone
(74) *Attorney, Agent, or Firm* — Jeffrey M. Olofson

(57) ABSTRACT

Nanocomposite blends include metal oxide nanoparticles and at least two (meth)acrylic acid polymers where the nanoparticles are surface modified with a carboxylic acid silane and where the (meth)acrylic acid polymers are at least partially neutralized. The compositions are transparent, with high transmission and low haze up to very high nanoparticle loading. The compositions also exhibit improved mechanical properties of impact resistance and tensile modulus.

20 Claims, 2 Drawing Sheets

(51) Int. Cl.
  *B82Y 40/00*  (2011.01)
  *C07F 7/08*  (2006.01)
  *C09D 1/04*  (2006.01)
  *C09D 7/40*  (2018.01)
  *G02B 1/04*  (2006.01)
  *G02B 1/14*  (2015.01)
  *G02B 5/00*  (2006.01)

(52) U.S. Cl.
  CPC .............. *G02B 1/04* (2013.01); *G02B 1/14* (2015.01); *G02B 5/00* (2013.01); *B82Y 30/00* (2013.01); *B82Y 40/00* (2013.01)

(56) References Cited

U.S. PATENT DOCUMENTS

| | | |
|---|---|---|
| 4,539,263 A | 9/1985 | Hoh |
| 4,847,164 A | 1/1989 | Neill |
| 4,884,814 A | 12/1989 | Sullivan |
| 4,911,451 A | 3/1990 | Sullivan |
| 5,120,791 A | 6/1992 | Sullivan |
| 5,210,138 A | 5/1993 | Yamamoto |
| 5,328,959 A | 7/1994 | Sullivan |
| 5,415,937 A | 5/1995 | Cadorniga |
| 5,504,156 A | 4/1996 | Takezaki |
| 5,516,847 A | 5/1996 | Sullivan |
| 5,567,772 A | 10/1996 | Hagman |
| 5,587,430 A | 12/1996 | Talkowski |
| 5,688,869 A | 11/1997 | Sullivan |
| 5,691,418 A | 11/1997 | Hagman |
| 5,700,890 A | 12/1997 | Chou |
| 5,859,137 A | 1/1999 | Chou |
| 5,873,796 A | 2/1999 | Cavallaro |
| 5,929,174 A | 7/1999 | Permentier |
| 6,818,163 B1 | 11/2004 | Fibiger |
| 6,861,481 B2 | 3/2005 | Ding |
| 7,297,731 B2 | 11/2007 | Walker, Jr. |
| 7,980,910 B2 | 7/2011 | Padiyath |
| 8,338,539 B2 | 12/2012 | Arhart |
| 8,617,639 B2 | 12/2013 | Nakajima |
| 8,987,369 B2 | 3/2015 | Bekiarian |
| 11,674,003 B2 * | 6/2023 | Condo ............. C08K 3/36 524/493 |
| 2008/0161503 A1 | 7/2008 | Chou |
| 2014/0005313 A1 * | 1/2014 | Bekiarian ............. C08K 9/06 524/188 |
| 2015/0197660 A1 * | 7/2015 | Ronne ............. C08F 2/22 524/430 |
| 2015/0251384 A1 | 9/2015 | Bennison |
| 2015/0330597 A2 | 11/2015 | Schaffer |

FOREIGN PATENT DOCUMENTS

| | | |
|---|---|---|
| WO | 2017-015885 | 2/2017 |
| WO | WO 2020-026085 | 2/2020 |

OTHER PUBLICATIONS

Barabanova A I et al, Anhydride Modified Silica Nanoparticles: Preparation and Characterization, Applied Surface Science, Elsevier, Amsterdam, NL vol. 258, No. 7, Nov. 13, 2011 (Nov. 13, 2011) pp. 3168-3172, XP028434259.

"Aliphatic Urethane Acrylate Oligomer", CN9010, Sartomer Arkema, 2015, p. 1.

"Product Catalog", Sartomer Arkema, 2015, pp. 1-50.

An, "Preparation and Self-Assembly of Carboxylic Acid-Functionalized Silica", Journal of Colloid and Interface Science, 2007, vol. 311, No. 02, pp. 507-513, XP022083115.

Tachino, "Structure and Properties of Ethylene Ionomers Neutralized With Binary Metal Cations", Macromolecules, 1994, vol. 27, No. 02, pp. 372-378.

International Search Report for PCT International Application No. PCT/IB2019/056443, dated Nov. 22, 2019, 4 pages.

* cited by examiner

TRANSPARENT ELASTOMERIC NANOCOMPOSITE BLENDS

CROSS REFERENCE TO RELATED APPLICATIONS

This application is a national stage filing under 35 U.S.C. 371 of PCT/IB2019/056443, filed Jul. 29, 2019, which claims the benefit of U.S. Provisional Application No. 62/711,891, filed Jul. 30, 2018, the disclosure of which is incorporated by reference in its/their entirety herein.

FIELD OF THE DISCLOSURE

The current disclosure relates to transparent nanocomposites of polymer blends and surface-modified nanoparticles and articles prepared with these transparent nanocomposite blends.

BACKGROUND

Displays and electronic devices have evolved to be curved, bent, or folded and provide new user experiences. These device architectures may include flexible organic light emitting diodes (OLEDs), plastic liquid crystal displays (LCDs) and the like, for example.

In order to realize such flexible displays and protect elements in the displays, a flexible cover sheet or flexible window film replaces a conventional glass cover sheet. This flexible cover sheet has a number of design parameters such as high visible light transmission, low haze, excellent scratch resistance and puncture resistance, in order to protect the elements included in the display devices. In some cases, the flexible cover sheet may also need to withstand thousands of folding events around a tight bend radius (about 5 mm or less) without showing visible damage. In other cases, the flexible cover sheet must be able to unfold without leaving a crease after being bent at elevated temperature and humidity.

SUMMARY

The current disclosure relates to transparent nanocomposite blends of polymers and surface-modified nanoparticles, optical film articles, and optical articles prepared with these transparent nanocomposite blends, and methods of preparing optical articles.

In some embodiments, the nanocomposite blends comprise at least two (meth)acrylic polymers or copolymers comprised of monomers selected from the group consisting of methacrylic acid and acrylic acid, where the (meth)acrylic polymers or copolymers are miscible and at least partially neutralized, and surface-modified metal oxide nanoparticles, where the surface-modified metal oxide nanoparticles are surface modified with a surface modifying agent comprising a carboxylic acid silane of Formula 1:

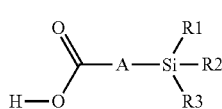

Formula 1 where R1 is a $C_1$ to $C_{10}$ alkoxy group; and R2 and R3 are independently selected from the group consisting of $C_1$ to $C_{10}$ alkyl and $C_1$ to $C_{10}$ alkoxy groups, and A is a linker group selected from the group consisting of $C_1$ to $C_{10}$ alkylene or arylene groups, $C_1$ to $C_{10}$ aralkylene groups, $C_2$ to $C_{16}$ heteroalkylene or heteroarylene groups, and $C_2$ to $C_{16}$ amide containing groups.

Also disclosed are optical film articles. In some embodiments, the optical film articles comprise at least one layer of a polymer nanocomposite blend, wherein the polymer nanocomposite blend comprises at least two (meth)acrylic polymers or copolymers comprised of monomers selected from the group consisting of methacrylic acid and acrylic acid, and surface-modified metal oxide nanoparticles, where the (meth)acrylic polymers or copolymers are miscible and at least partially neutralized, and the surface-modified metal oxide nanoparticles are surface modified with a surface modifying agent comprising a carboxylic acid silane of Formula 1:

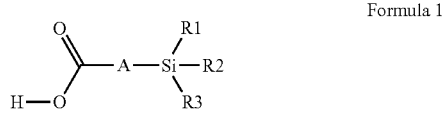

Formula 1 where R1 is a $C_1$ to $C_{10}$ alkoxy group, and R2 and R3 are independently selected from the group consisting of $C_1$ to $C_{10}$ alkyl and $C_1$ to $C_{10}$ alkoxy groups, and A is a linker group selected from the group consisting of $C_1$ to $C_{10}$ alkylene or arylene groups, $C_1$ to $C_{10}$ aralkylene groups, $C_2$ to $C_{16}$ heteroalkylene or heteroarylene groups, and $C_2$ to $C_{16}$ amide containing groups. In some embodiments, the optical film article is a multi-layer article.

Also disclosed are optical articles. In some embodiments, the optical articles comprise a display device and an optical film article in contact with a surface of the display device. The optical film article comprises a flexible, bendable, rollable, foldable, or formable optical film. The optical film articles are described above.

Also disclosed are methods of preparing optical articles. A method of preparing an optical article comprising: preparing a nanocomposite blend, wherein preparing a nanocomposite blend comprises: (a) preparing of an aqueous nanodispersion of surface-modified metal oxide nanoparticles, wherein the surface of the metal oxide nanoparticles are modified with a carboxylic acid silane surface modifying agent; (b) preparing of an aqueous dispersion of a first (meth)acrylic polymer or copolymer wherein the (meth)acrylic polymer or copolymer is at least partially neutralized; (c) combining the dispersions of (a) and (b) to form an aqueous nanodispersion of surface-modified metal oxide nanoparticles and first (meth)acrylic polymer or copolymer; (d) drying and/or concentrating the nanodispersion of (c); and (e) melt processing the dried and/or concentrated nanodispersion (d) and second (meth)acrylic polymer or copolymer to form a nanocomposite blend of surface-modified metal oxide nanoparticles and (meth)acrylic polymers or copolymers, wherein the surface of the metal oxide nanoparticles is modified with a carboxylic acid silane surface modifying agent, and the (meth)acrylic polymers or copolymers are at least partially neutralized.

In some embodiments of preparing an optical article, the method comprises preparing a nanocomposite blend, wherein preparing a nanocomposite blend comprises: (a) preparing of an aqueous nanodispersion of surface-modified metal oxide nanoparticles, wherein the surface of the metal oxide nanoparticles is modified with a carboxylic acid silane surface modifying agent; (b) preparing of an aqueous dispersion of at least two (meth)acrylic polymers or copolymers wherein the (meth)acrylic polymers or copolymers are at least partially neutralized; (c) combining the dispersions of (a) and (b) to form an aqueous nanodispersion of surface-modified metal oxide nanoparticles and (meth)acrylic polymers or copolymers; (d) drying and/or concentrating the nanodispersion of (c); and (e) melt processing the dried and/or concentrated nanodispersion (d) to form a nanocomposite blend of surface-modified metal oxide nanoparticles and (meth)acrylic polymers or copolymers, where the surface of the metal oxide nanoparticles is modified with a carboxylic acid silane surface modifying agent, and the (meth)acrylic polymers or copolymers are at least partially neutralized.

In some embodiments, the nanocomposite blend is in the form of an optical film article as described above, and the optical film article can be contacted to the surface of a display device to form an optical article as described above.

BRIEF DESCRIPTION OF THE DRAWINGS

The present application may be more completely understood in consideration of the following detailed description of various embodiments of the disclosure in connection with the accompanying drawings.

Figure 1:
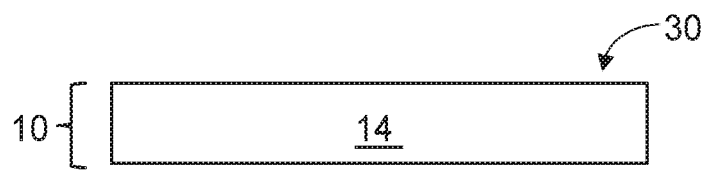
FIG. 1 is a schematic diagram side elevation view of an illustrative flexible optical film of this disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

A wide variety of substrates are used in optical articles that are relatively rigid. Among these substrates are materials like glass plates and polymeric plates such as polycarbonate and polymethylmethacrylate plates. While these rigid substrates can have desirable optical transparency, because they are rigid they are not flexible enough for use in a wide range of new optical devices.

Emerging display technologies promise flexible displays that are bendable, rollable, and even foldable for which the rigid glass solution of today's flat panel display electronics is not viable. Displays are also emerging with three dimensional shapes amenable to molding. While plastics are moldable, rigid glass is not. New display materials are required to realize these evolutions in display technology.

New display materials must provide the historical benefits of glass such as high visible light transmission and low haze, abrasion resistance, impact resistance, chemical resistance, as well as satisfying the new demands of flexibility such as folding around a tight bend radius, and ability to withstand hundreds of thousands of folding events without deterioration of properties. Ionic elastomers possess some of the desired properties such as high visible transmission and low haze, chemical resistance, and flexibility. Being a plastic, ionic elastomers also possess the added advantage over glass of being moldable into three dimensional shapes. However, these ionic elastomeric polymers lack the required mechanical features or abrasion resistance, impact resistance, tensile modulus, and the like.

Particulate fillers have been incorporated into polymers to improve mechanical properties. However, the vast majority of commercially available filled polymers are opaque and thus are unsuitable for use in optical articles. Additionally, rigid particulate fillers can adversely affect the flexibility properties of the polymers with which they are combined.

One technique for providing modified properties is to blend polymeric materials.

This approach can be problematic as the preparation of blends to improve one property, such as flexibility, can adversely affect other properties, such as optical properties. This is especially true for optical properties, since the vast majority of polymer blends have at least some degree of immiscibility. A lack of miscibility can dramatically affect optical properties such as visible light transmission, haze and clarity. Even polymers that have the same or similar monomeric composition can be immiscible, if, for example, the polymers have differing degrees of branching. Thus, modification of a polymeric composition by blending the polymeric composition with another polymer, even a seemingly similar polymer, is not a trivial undertaking, especially when the blended composition has requisite optical properties.

The nanocomposite blends of the present disclosure achieve the contradictory goals of flexibility, optical transparency and improved mechanical properties. The nanocomposite blends of the present disclosure, sometimes called "polymer nanocomposite blends" comprise a matrix that is a blend of at least two polymers and a surface-modified nanoparticle filler.

The nanocomposite blends of the present disclosure utilize metal oxide nanoparticles, which are particles with an average diameter that is in the nanometer range. These particles give improved mechanical properties to the nanocomposite blends, and because of their small size the nanoparticles do not scatter visible light. The nanoparticles can be surface modified to achieve compatibility with the polymer to avoid agglomeration or aggregation of the nanoparticles in the polymer nanocomposite blend which would lead to inferior optical properties. The surface modifying agent is a carboxylic acid-functional silane. While not wishing to be bound by theory, it is believed that the acid-functional groups on the surface modifying agent improve the compatibility of the particles with the acid-functional (meth)acrylic polymers of the blend. Some of the acid-functional groups on the surface-modified nanoparticles may also be neutralized like at least some of the acid-functional groups on the (meth)acrylic polymers.

Disclosed herein are nanocomposite blend compositions that are melt processable and optically transparent. These nanocomposite blend compositions can be used to form a wide range of articles. The nanocomposite blend compositions comprise at least two different (meth)acrylic polymers or copolymers, and surface-modified metal oxide nanoparticles, where the surface-modified metal oxide nanoparticles are surface modified with a carboxylic acid-functional silane surface modifying agent, and where the (meth)acrylic polymers or copolymers are miscible and at least partially neutralized. Also disclosed herein are articles that contain these nanocomposite blend compositions and methods for preparing and using these nanocomposite blend compositions.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

As used herein, the term "adjacent" refers to two layers that are proximate to another layer. Layers that are adjacent may be in direct contact with each other, or there may be an intervening layer. There is no empty space between layers that are adjacent.

As used herein the terms "display film", "protective layer", "protective display film", "window film", "cover sheet" and "cover window film" are used interchangeably.

The terms "Tg" and "glass transition temperature" are used interchangeably and the terms "Tm" and "melting temperature" are similarly used interchangeably. If measured, Tg or Tm values are determined by Differential Scanning Calorimetry (DSC) at a scan rate of 10° C./minute, unless otherwise indicated. Typically, Tg values for copolymers are not measured but are calculated using the well-known Fox Equation, using the Tg values provided by the monomer supplier for homopolymers prepared from those monomers, as is understood by one of skill in the art.

The terms "room temperature" and "ambient temperature" are used interchangeably and have their conventional meaning, that is to say a temperature of from 20-25° C.

The terms "(meth)acrylic" and "(meth)acrylate" refer to polymers and monomers of acrylic or methacrylic acid and the alcohol esters of acrylic or methacrylic acid. Acrylate and methacrylate monomers and polymers are referred to collectively herein as "(meth)acrylates" or "(meth)acrylic". Polymers and copolymers described herein as (meth)acrylics or (meth)acrylates may contain additional ethylenically unsaturated monomers.

The terms "free radically polymerizable" and "ethylenically unsaturated" are used interchangeably and refer to a reactive group which contains a carbon-carbon double bond which is able to be polymerized via a free radical polymerization mechanism.

The term "polymer" is used herein consistent with the common usage in chemistry. Polymers are macromolecules composed of many repeated subunits. The term polymer encompasses homopolymers, i.e. polymers formed from one type of monomer, and copolymers where the polymer is formed from two or more co-polymerizable monomers.

The terms "miscible" or "miscibility" refer to at least two polymers that are compatible with each other such that blends of the at least two polymers do not phase separate so as to form phase separated microdomains that are large enough to produce significant scattering of visible light (wavelengths of about 400 to about 700 nm).

The terms "immiscible" or "immiscibility" refer to at least two polymers that are incompatible with each other such that blends of the at least two polymers do phase separate so as to form phase separated microdomains that are large enough to produce significant scattering of visible light (wavelengths of about 400 to about 700 nm) resulting in unacceptable haze.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkoxy" refers to a monovalent group of the type —OR, where R is an alkyl group.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof.

Some heteroalkylenes are polyoxyalkylenes where the heteroatom is oxygen such as for example,

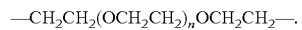

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, nitrogen or halogens such as fluorine, chlorine, bromine or iodine.

The term "aralkylene" refers to a divalent group of formula —$R_a$—$Ar^a$— where $R^a$ is an alkylene and $Ar^a$ is an arylene (i.e., an alkylene is bonded to an arylene).

The term "alkaryl" refers to a monovalent group of formula —$R^a$—$Ar^a$ where $R^a$ is an alkylene and $Ar^a$ is an aryl (i.e., an alkylene is bonded to an aryl).

Unless otherwise indicated, "optically transparent" refers to a layer, film, or article that has a high light transmittance over at least a portion of the visible light spectrum (about 400 to about 700 nm). Typically, optically transparent layers, films, or articles have a luminous transmission of at least 80% and a haze value of 10% or less.

Unless otherwise indicated, "optically clear" refers to a layer, film, or article that has a high light transmittance over at least a portion of the visible light spectrum (about 400 to about 700 nm), and that exhibits low haze. Typically, optically clear layers, films, or articles have visible light transmittance values of at least 80%, often at least 90%, and haze values of 5% or less, 4% or less, often 3% or less. Luminous transmission and haze can be measured using the techniques described in the Examples section.

As used herein the term "nominally colorless" refers to compositions that are generally color neutral on the yellow index with b* values being less than 5 or less than 3.

As used herein, "dispersion" refers to one or more (meth) acrylic polymers or copolymers dispersed in water, wherein the one or more (meth)acrylic polymers or copolymers are at least partially neutralized.

As used herein, "nanodispersion" refers to a liquid colloidal dispersion of metal oxide nanoparticles, wherein the liquid medium is water, organic solvent, or combination thereof, and wherein the nanodispersion may or may not include one or more (meth)acrylic acid polymers or copolymers.

As used herein, the terms "nanocomposite" and "polymer nanocomposite" are used interchangeably and refer to compositions that include a polymeric matrix with metal oxide nanoparticles dispersed therein.

As used herein, the terms "nanocomposite blend" and "polymer nanocomposite blend" are used interchangeably and refer to compositions that include a polymeric matrix of at least two polymers with metal oxide nanoparticles dispersed therein.

As used herein, "surface unmodified nanoparticle" refers to a metal oxide nanoparticle with a surface that has not been altered chemically. In the case of colloidal silica, the unmodified nanoparticle surface is predominantly silanol groups, Si—OH.

As used herein, "surface-modified nanoparticle" refers to a metal oxide nanoparticle, with a surface that has been altered chemically or surface modified.

As used herein, "silica" refers to amorphous silicon dioxide.

As used herein, "adhesive" refers to polymeric compositions useful to adhere together two adherends. Examples of adhesives are pressure sensitive adhesives and heat activated adhesives.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Heat activated adhesives are non-tacky at room temperature but become tacky and capable of bonding to a substrate at elevated temperatures. These adhesives usually have a Tg or Tm above room temperature. When the temperature is elevated above the Tg or Tm, the storage modulus usually decreases and the adhesive become tacky.

Disclosed herein are nanocomposite blend compositions that comprise at least two different (meth)acrylic polymers or copolymers, and surface-modified metal oxide nanoparticles, where the surface-modified metal oxide nanoparticles are surface modified with an acid-functional silane surface modifying agent, and wherein the (meth)acrylic polymers or copolymers are miscible and at least partially neutralized. Typically, the nanocomposite blend compositions are melt processable and are optically transparent. By melt processable it is meant that the compositions are able to be melt processed, that is to say that the compositions can be heated and made to flow without causing degradation. Melt processable does not mean that the composition has been melt processed and in no way indicates a processing step.

A wide range of (meth)acrylic polymers and copolymers are suitable for use in the nanocomposite blend compositions of this disclosure. As mentioned above, the blend comprises at least two different (meth)acrylic polymers or copolymers. The (meth)acrylic polymers and copolymers comprise acrylic acid or methacrylic acid monomers. In some embodiments, the (meth)acrylic polymers comprise homopolymers of acrylic acid or methacrylic acid. In other embodiments, the (meth)acrylic polymers are copolymers of at least one (meth)acrylic monomer that is acid-functional and at least one monomer that is a (meth)acrylate that is not acid-functional. Additionally, the (meth)acrylic polymers can contain other non-(meth)acrylate monomers that are co-polymerizable with the (meth)acrylic and (meth)acrylate monomers. The copolymers can be formed by the polymerization or copolymerization using free radical polymerization techniques. In some embodiments, the at least one (meth)acrylic polymer comprises a copolymer containing (meth)acrylic acid and at least one co-monomer. A wide range of co-monomers are suitable. Suitable co-monomers include ethylene, propylene, alkyl(meth)acrylates, aryl (meth)acrylates, alkaryl(meth)acrylates, acrylonitrile, and carbon monoxide.

In some embodiments, the (meth)acrylic polymers comprise a copolymer of acrylic acid or methacrylic acid and at least on additional monomer. Typically, the (meth)acrylic acid monomer is present in amounts of 14% by weight or greater. Typically, the difference in (meth)acrylic acid monomer of (meth)acrylic copolymers in the nanocomposite blend is 6% by weight or less. In some embodiments the at least one additional monomer is ethylene, propylene or a combination of ethylene and propylene. In other embodiments, the (meth)acrylic polymer comprises a copolymer of acrylic acid or methacrylic acid and ethylene, propylene or a combination of ethylene and propylene and at least one third monomer. Generally, the third monomer comprises an alkyl (meth)acrylate monomer. Examples of suitable alkyl (meth)acrylate monomers include, n-butyl acrylate, iso-butyl acrylate, isopropyl acrylate, n-propyl acrylate, ethyl acrylate, methyl acrylate, 2-ethylhexyl acrylate, iso-octyl acrylate and methyl methacrylate.

A wide range of blends of (meth)acrylic polymers or copolymers are suitable. Examples of suitable blends include blends or acrylic acid or methacrylic acid homopolymers with copolymers of acrylic acid or methacrylic acid and at least one additional monomer. Other examples include blends of acrylic acid or methacrylic acid homopolymers with copolymers of acrylic acid or methacrylic acid and at least two additional monomers. In some embodiments, the blends include a copolymer of acrylic acid or methacrylic acid and at least one additional monomer with a different copolymer of acrylic acid or methacrylic acid and at least one additional monomer. Yet other embodiments comprise blends of a copolymer of acrylic acid or methacrylic acid and at least one additional monomer with a copolymer of acrylic acid or methacrylic acid and at least two additional monomers. Additionally, the blend can also comprise different copolymers of acrylic acid or methacrylic acid and at least two additional monomers.

In some embodiments, the difference in the content of (meth)acrylic acid monomer in the first and the second copolymer is less than 6% by weight. The similarity of the monomer content helps the compatibility of the polymers.

In some embodiments, the (meth)acrylic polymers or copolymers are at least partially neutralized. By this it is meant that the proton of the carboxylic acid group is replaced by a cation, typically a metal cation. Monovalent, divalent, and higher valency cations are suitable. Examples of suitable cations include sodium cations, calcium cations, potassium cations, zinc cations, lithium cations, magnesium cations, and aluminum cations. Combinations of cations can also be used.

Suitable ethylene (meth)acrylic acid copolymers can be obtained from commercial sources such as PRIMACOR 5980i from Dow Chemical Company (Midland, MI), NUCREL 960 from E. I. du Pont de Nemours and Company (Wilmington, DE), ESCOR 5200 from Exxon-Mobil (Irving, TX), and AC-5180 from Honeywell (Morris Plains, NJ).

Suitable aqueous dispersions of partially neutralized ethylene (meth)acrylic acid copolymers can be obtained from commercial sources such as MICHEM PRIME 4990R from Michelman, Inc. (Cincinnati, OH). Suitable partially neutralized ethylene (meth)acrylic acid copolymers can be obtained from commercial sources such as include SUR-LYN 1706, 1707, 7940, 9020, 9120, and PC-350, and HPF 1000 from E. I. du Pont de Nemours and Company (Wilmington, DE).

A wide range of metal oxide nanoparticles are suitable. Examples of suitable metal oxide nanoparticles include metal oxides of silicon (silicon is considered to be a metalloid and thus is included in the list of metal oxides), titanium, aluminum, hafnium, zinc, tin, cerium, yttrium, indium, antimony or mixed metal oxides thereof. Among the more desirable metal oxide nanoparticles are those of silicon, i.e. silica nanoparticles.

The size of such particles is chosen to avoid significant visible light scattering. The surface-modified metal oxide nanoparticles can be particles having a (e.g. unassociated) primary particle size or associated particle size of greater than 1 nm (nanometers) and less than 200 nm. In some embodiments, the particle size is greater than 4 nm, greater than 5 nm, greater than 10 nm, or greater than 20 nm. In some embodiments, the particle size is less than 190 nm, less than 150 nm, less than 100 nm, less than 75 nm, or less than 50 nm. Typically, the nanoparticles have a size ranging from 4-190 nm, 4-100 nm, 4-75 nm, 10-50 nm, or 20-50 nm. It is desirable that the nanoparticles are unassociated. Particle size can be measured in a wide variety of ways such as by transmission electron microscopy (TEM). Typically, commercially obtained metal oxide nanoparticles are supplied with a listed particle size or particle size range.

The nanoparticles are surface modified to improve compatibility with the polymer matrix material and to keep the nanoparticles non-associated, non-agglomerated, non-aggregated, or a combination thereof. The surface modification used to generate the surface-modified nanoparticles includes at least one acid-functional silane surface modifying agent. The acid-functional silane surface modifying agent has the general Formula 1:

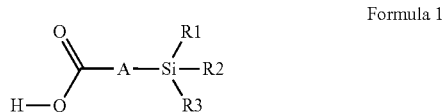

Formula 1 where R1 is a $C_1$ to $C_{10}$ alkoxy group; and R2 and R3 are independently selected from the group consisting of $C_1$ to $C_{10}$ alkyl and $C_1$ to $C_{10}$ alkoxy groups. The group A is a linker group selected from the group consisting of $C_1$ to $C_{10}$ alkylene or arylene groups, $C_1$ to $C_{10}$ aralkylene groups, $C_2$ to $C_{16}$ heteroalkylene or heteroarylene groups, and $C_2$ to $C_{16}$ amide containing groups. Amide containing groups include groups of the type $-(CH_2)_a-NH-(CO)-(CH_2)_b-$; where a and b are integers of 1 or greater, and (CO) is a carbonyl group C=O. In some embodiments, A is an alkylene group with 1-3 carbon atoms.

While acid-functional silanes may be commercially available, one aspect of the current disclosure includes the synthesis of the carboxylic acid-functional silanes of Formula 1. In addition to the synthetic scheme presented below, an anhydride-functional silane such as (3-triethoxysilyl)propylsuccinic anhydride, which can be obtained from commercial sources such as Gelest, Inc. (Morrisville, PA), could be used to prepare the acid-functional silane surface modification agent.

In one embodiment of this disclosure, a solution is prepared of an organic acid anhydride dissolved in a first organic solvent. A second solution is prepared of an aminosilane in a second organic solvent. The two solutions are combined. The combined solution is stirred continuously at a suitable temperature and duration to synthesize a carboxylic acid-functional silane of Formula 1. In another embodiment, a solution is prepared of an organic acid anhydride dissolved in an organic solvent. An aminosilane is dissolved in the organic acid anhydride solution. The solution containing the organic acid anhydride and aminosilane is stirred continuously at a suitable temperature and duration to synthesize a carboxylic acid silane of Formula 1. The first and second organic solvents may be the same or different. In the case where the first and second organic solvent are different, then the first and second organic solvents are miscible. Both first and second organic solvents are miscible with water.

Suitable organic acid anhydrides include succinic anhydride (3,4-dihdrofuran-2,5-dione), tetrahydrofuran-2,5-dione, 3-alkyltetrahydrofuran-2,5-diones such as 3-methyltetrahydrofuran-2,5-dione and 3-ethyltetrahydrofuran-2,5-dione, tetrahydropyran-2,6-dione, 3-alkyltetrahydropyran-2,6-diones such as 3-methyltetrahydropyran-2,6-dione and 3-ethyltetrahydropyran-2,6-dione 4-alkyltetrahydropyran-2,6-diones such as 4-methyltetrahydropyran-2,6-dione, 4-ethyltetrahydropyran-2,6-dione, and 4,4'-methyltetrahydropyran-2,6-dione, oxepane-2,7-dione. Suitable organic acid anhydrides can be obtained from commercial sources such as Alfa Aesar (Ward Hill, MA) and Millipore Sigma (Burlington, MA). Succinic anhydride is a particularly suitable organic acid anhydride.

Suitable aminosilanes include aminopropyltrimethoxysilane, aminopropyltriethoxysilane, p-aminophenyltrimethoxysilane, p-aminophenyltriethoxysilane, N-phenylaminopropyltrimethoxysilane, N-phenylaminopropyltriethoxysilane, n-butylaminopropyltrimethoxysilane, n-butylaminopropyltriethoxysilane, 3-(N-allylamino)propyltrimethoxysilane, (N,N-diethyl-3-aminopropyl)trimethoxysilane, and (N,N-diethyl-3-aminopropyl)triethoxysilane.

Suitable aminosilanes can be obtained from commercial sources such as Gelest, Inc. (Morrisville, PA), Alfa Aesar (Ward Hill, MA), Millipore Sigma (Burlington, MA), and Momentive Performance Materials (Waterford, NY). A particularly suitable aminosilane is aminopropyltrimethoxysilane.

A wide variety of organic solvents can be used. Suitable organic solvents include N,N-dimethylformamide (DMF) which can be obtained from commercial sources such as OmniSolv (Billerica, MA).

The surface-modified metal oxide nanoparticles are prepared by combining an aqueous nanodispersion of surface unmodified metal oxide nanoparticles of basic pH and a carboxylic acid-functional silane surface modifying agent, reacting the carboxylic acid-functional silane surface agent with the metal oxide nanoparticle surface resulting in an aqueous nanodispersion of surface-modified metal oxide nanoparticles wherein the nanoparticles are surface modified with a carboxylic acid. This can be carried out in a variety of ways. In some embodiments, an aqueous nanodispersion of surface unmodified metal oxide nanoparticles is combined with a solution of a carboxylic acid silane of Formula 1 in an organic solvent. In other embodiments, an aqueous nanodispersion of surface unmodified metal oxide nanoparticles is combined with a base and a solution of a carboxylic acid silane of Formula 1 in an organic solvent. In other embodiments, an aqueous nanodispersion of surface unmodified metal oxide nanoparticles is combined with a carboxylic acid silane of Formula 1. Generally, the carboxylic acid silane of Formula 1 is added at a concentration sufficient to modify 10 to 100% of the total metal oxide nanoparticle surface area in the nanodispersion. As was mentioned above, the metal oxide nanoparticles may have a variety of sizes. Typically, the average particle size is greater than 1 nm and less than 200 nm. In some embodiments, the particle size is greater than 4 nm, greater than 5 nm, greater than 10 nm, or greater than 20 nm. In some embodiments, the particle size is less than 190 nm, less than 150 nm, less than 100 nm, less than 75 nm, or less than 50 nm. Typically, the nanoparticles have a size ranging from 4-190 nm, 4-100 nm, 4-75 nm, 10-50 nm, or 20-50 nm. The surface unmodified metal oxide nanoparticles may be dispersed in an aqueous solution with a pH in the range 8-12. In some cases, a base may be added to the aqueous nanodispersion of surface unmodified metal oxide nanoparticles to maintain the pH in the desired range since the addition of the carboxylic acid silane solution of Formula 1 will tend to lower pH. In some cases, the organic solvent is removed from of the solution of carboxylic acid silane in organic solvent prior to combining the carboxylic acid silane and aqueous nanodispersion of surface unmodified metal oxide nanoparticles.

Aqueous nanodispersions of unmodified metal oxide nanoparticles may be prepared or in some embodiments, aqueous nanodispersions of unmodified metal oxide nanoparticles may be obtained commercially. Suitable surface unmodified metal oxide nanoparticles include aqueous nanodispersions commercially available from Nalco Chemical Company (Naperville, IL) under the trade designation "Nalco Colloidal Silicas" such as products NALCO 2326, 1130, DVSZN002, 1142, 2327, 1050, DVSZN004, 1060, and 2329K; from Nissan Chemical America Corporation (Houston, TX) under the tradename SNOWTEX such as products ST-NXS, ST-XS, ST-S, ST-30, ST-40, ST-N40, ST-50, ST-XL, and ST-YL; from Nyacol Nano Technologies, Inc. (Ashland, MA) such as NEXSIL 5, 6, 12, 20, 85-40, 20A, 20K-30, and 20NH4.

Suitable bases include ammonium hydroxide which can be obtained from commercial sources such as Millipore Sigma (Burlington, MA).

Typically, the surface-modified metal oxide nanoparticles are used as a nanodispersion, and the particles are not isolated. Another aspect of the present disclosure involves the preparation of nanodispersions of surface-modified metal oxide nanoparticles without precipitation, gelation, agglomeration, or aggregation, where the metal oxide nanoparticles are surface modified with a carboxylic acid silane of Formula 1.

In some embodiments, an aqueous nanodispersion of surface unmodified metal oxide nanoparticles and solution of a carboxylic acid silane of Formula 1 in an organic solvent are combined in a reactor and heated at a suitable temperature and duration to react the carboxylic acid silane of Formula 1 with the surface of the metal oxide nanoparticles. In other embodiments, an aqueous nanodispersion of surface-unmodified metal oxide nanoparticles, base, and a solution of carboxylic acid silane of Formula 1 in an organic solvent are combined in a reactor and heated at a suitable temperature and duration to react the carboxylic acid silane of Formula 1 with the surface of the metal oxide nanoparticles. In some embodiments, a solvent exchange is performed on the aqueous nanodispersion of surface-modified metal oxide nanoparticles and organic solvent to remove the organic solvent. In some embodiments, the reactor is open, under reflux conditions, and in other embodiments the reactor is closed and under pressure. In some embodiments, the reactor is glass and in some embodiments the reactor is stainless steel.

A wide range of loadings of the surface-modified metal oxide nanoparticles in the nanocomposite blend composition are suitable. Typically, the nanocomposite comprises at least 1% by weight of surface-modified metal oxide nanoparticles and no more than 70% by weight of surface-modified metal oxide nanoparticles. In some embodiments, the surface-modified metal oxide nanoparticle concentration comprises from 5-60% by weight, or from 10-50% by weight.

Additional additives may include flame retardants, thermal stabilizers, anti-slip agents, neutralizing agents, UV absorbers, light stabilizers, antioxidants, crosslinking agents, mold release agents, catalysts, colorants, anti-stat agents, defoamers, plasticizers, and other processing aids.

The nanocomposite blends may comprise a wide range of configurations and articles. In some embodiments, the nanocomposite blend may be configured into continuous or discontinuous articles. For example, the nanocomposite blends may be in the form of a film, a sheet, a filament, particles, pellets, flakes, and the like. Additionally, an advantage of the nanocomposite blends is they may be in the configuration of a formed article. Forming is a commonly used process in the plastics art and includes molding techniques such as rotational molding, injection molding, blow molding, compression molding, and vacuum molding.

Forming techniques can be used to form the nanocomposite blend into a wide range of three dimensional shapes. As mentioned above, the ability to form the nanocomposite blends into three dimensional shapes is something that more rigid materials such as glass are unable to do.

Also disclosed herein are a wide array of articles. Typically, the articles are optical articles. In some embodiments, the optical articles are optical film articles. In other embodiments, the articles are optical articles that include a display device as well as an optical film article. In other embodiments, the articles are optical articles that include a photovoltaic device as well as an optical film article.

Optical film articles are articles that comprise an optical film. By this it is meant that the article may be an optical film or it may include an optical film with other elements. In some embodiments, the optical film article comprises at least one layer of a polymer nanocomposite blend, where the polymer nanocomposite blend comprises at least two (meth)acrylic polymers or copolymers comprised of monomers selected from the group consisting of methacrylic acid and acrylic acid, and surface-modified metal oxide nanoparticles. Typically, the (meth)acrylic polymers or copolymers are miscible and at least partially neutralized. The surface-modified metal oxide nanoparticles are surface modified with a surface modifying agent comprising a carboxylic acid silane of Formula 1:

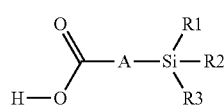

Formula 1 where R1 is a $C_1$ to $C_{10}$ alkoxy group; and R2 and R3 are independently selected from the group consisting of $C_1$ to $C_{10}$ alkyl and $C_1$ to $C_{10}$ alkoxy groups. The group A is a linker group selected from the group consisting of $C_1$ to $C_{10}$ alkylene or arylene groups, $C_1$ to $C_{10}$ aralkylene groups, $C_2$ to $C_{16}$ heteroalkylene or heteroarylene groups, and $C_2$ to $C_{16}$ amide containing groups. Amide containing groups include groups of the type —$(CH_2)_a$—NH—(CO)—$(CH_2)_b$—; where a and b are integers of 1 or greater, and (CO) is a carbonyl group C=O. In some embodiments, A is an alkylene group with 1-3 carbon atoms. These nanocomposite blends are discussed in detail above.

The optical film articles have a wide range of desirable properties. The optical film articles are flexible, bendable, rollable, and/or foldable. These properties can be measured in a wide variety of ways as is well understood by one of ordinary skill in the art. In some embodiments, the optical film articles are formable into a wide variety of three dimensional shapes. Besides the above listed mechanical properties, the optical film articles also have desirable optical properties. Generally, the optical film articles are optically transparent and may be optically clear. Typically, optically transparent optical film articles have a luminous transmission in the visible light spectrum (about 400 to about 700 nm) of at least 80% and have a haze value of 10% or less. In some embodiments, the optical film articles have a luminous transmission in the visible light spectrum (about 400 to about 700 nm) of greater than 85%, greater than 87%, greater than 89%, or greater than 90%. In some embodiments, the optical film articles have a haze value of less than 7%, less than 5%, less than 4%, or even less than 3%. Luminous transmission and haze can be measured using the techniques described in the Examples section.

In some embodiments, the optical film articles are nominally colorless. As described above, this refers to compositions that are generally color neutral on the yellow index with b* values being less than 5. In some embodiments, the yellow index b* value is 4 or less, 3 or less, 2 or less, or even 1 or less.

In some embodiments, the optical film article is a multi-layer optical film article. By this it is meant that in addition to the at least one nanocomposite blend layer there is at least one additional layer in the optical film article. A wide variety of additional layers are suitable for use in the multi-layer optical film articles of this disclosure. The additional layer or layers may be a coating, a lamination, or a coextruded layer. Examples of suitable layers include permanent layers and removable layers. Permanent layers are those that remain within the multi-layer optical film article when it is used, whereas removable layers are those that are removed prior to the use of the multi-layer optical film article.

Examples of suitable permanent layers include transparent functional coating layers and transparent adhesive layers. A wide range of transparent functional coatings are suitable depending upon the desired properties of the optical film article. Examples of a suitable transparent functional coating layers include a hardcoat layer, an ultraviolet (UV) protective layer, a conductive layer, a barrier layer, microstructure layer, an anti-glare layer, an anti-reflective layer, an anti-fingerprint layer, or an anti-sparkle layer. Such layers are well known and understood in the art.

Examples of suitable transparent adhesive layers include transparent pressure sensitive adhesive layers and transparent heat activated adhesives. A wide range of suitable transparent pressure sensitive adhesives are known including (meth)acrylate-based adhesives, block copolymer adhesives, silicone adhesives, and the like. Examples of transparent heat activated adhesives include polyvinyl butyral (PVB). Examples of suitable adhesives include, for example, 3M OPTICALLY CLEAR ADHESIVES and 3M CONTRAST ENHANCEMENT FILMS.

Examples of removable layers include handling films and release liners. These layers can be attached to the multi-layer optical film article to protect the surfaces of the article during shipping and handling of the article, and are removed prior to the use of the article.

Also disclosed are optical articles comprising a display device, and an optical film article in contact with a surface of the display device. The optical film articles have been described above and include at least one layer of nanocomposite blend composition and may be a multi-layer film article.

A wide variety of display devices are suitable for the optical articles of this disclosure. The display device may include a display window. The display device can be any useful article such as a phone or smartphone, electronic tablet, electronic notebook, computer, and the like. The optical display may include an organic light emitting diode (OLED) display panel. The optical display may include a liquid crystal display (LCD) panel or a reflective display. Examples of reflective displays include electrophoretic displays, electrofluidic displays (such as an electrowetting display), interferometric displays or electronic paper display panels, and are described in US Patent Publication No. 2015/0330597. Further examples of optical displays include static display such as commercial graphic signs and billboards.

A wide variety of articles of this disclosure are suitable protective layers for photovoltaic devices such as encapsulant layers for photovoltaic solar panels.

In some embodiments, the optical article comprises a display device with a formed optical film article, wherein the formed optical film article is a molded optical film article.

Also disclosed herein are methods of preparing optical articles. In some embodiments, the method of preparing an optical article comprises preparing a nanocomposite blend, wherein preparing a nanocomposite blend comprises the steps of: (a) preparing of an aqueous nanodispersion of surface-modified metal oxide nanoparticles, wherein the surface of the metal oxide nanoparticles are modified with a carboxylic acid silane surface modifying agent; (b) preparing of an aqueous dispersion of a first (meth)acrylic polymer or copolymer wherein the (meth)acrylic polymer or copolymer is at least partially neutralized; (c) combining the dispersions of (a) and (b) to form an aqueous nanodispersion of surface-modified metal oxide nanoparticles and first (meth)acrylic polymer or copolymer; (d) drying and/or concentrating the nanodispersion of (c); and (e) melt processing a second (meth)acrylic acid polymer or copolymer with the dried and/or concentrated nanodispersion (d) to form a nanocomposite blend of surface-modified metal oxide nanoparticles and (meth)acrylic polymers or copolymers, wherein the surface of the metal oxide nanoparticles is modified with a carboxylic acid silane surface modifying agent, and the (meth)acrylic polymers or copolymers are at least partially neutralized. The (meth)acrylic polymers or copolymers and surface-modified metal oxide nanoparticles have been discussed in detail above.

In some embodiments, the (meth)acrylic polymers or copolymers added during melt processing are at least partially neutralized such is the case with ionomers. In some embodiments, the (meth)acrylic acid polymers or copolymers added during melt processing are un-neutralized. In some embodiments, additional neutralizing agent is added during melt processing. Additional neutralizing agents suitable for addition during melt processing include metal salts of oxides, hydroxides, acetates, and stearates of zinc, magnesium, sodium, lithium, calcium, potassium, and aluminum.

In some embodiments, the method of preparing a nanocomposite blend comprises the steps of: (a) preparing of an aqueous nanodispersion of surface-modified metal oxide nanoparticles, wherein the surface of the metal oxide nanoparticles are modified with a carboxylic acid silane surface modifying agent; (b) preparing of an aqueous dispersion of at least two (meth)acrylic polymers or copolymers wherein the (meth)acrylic polymers or copolymers are at least partially neutralized; (c) combining the dispersions of (a) and (b) to form an aqueous nanodispersion of surface-modified metal oxide nanoparticles and (meth)acrylic polymers or copolymers; (d) drying and/or concentrating the nanodispersion of (c); and (e) melt processing the dried and/or concentrated nanodispersion (d) to form a nanocomposite blend of surface-modified metal oxide nanoparticles and (meth)acrylic polymers or copolymers, wherein the surface of the metal oxide nanoparticles is modified with a carboxylic acid silane surface modifying agent, and the (meth)acrylic polymers or copolymers are at least partially neutralized. The (meth)acrylic polymers or copolymers and surface-modified metal oxide nanoparticles have been discussed in detail above.

In some embodiments, the nanodispersion is dried, meaning essentially all of the water and/or organic solvent is removed, in other embodiments, the nanodispersion is concentrated, meaning some of the water and/or organic solvent is removed, and in some embodiments a combination of concentration and drying is performed, such as concentrating by one method and drying by a different method. In some embodiments, drying is performed by such suitable methods as evaporative drying, thermal drying, or spray drying. Suitable concentration methods include evaporation methods such as the use of a falling film evaporator or wiped film evaporator, tangential flow filtration, and precipitation with the addition of a precipitant. Such methods as precipitation can be followed by separation methods such as decantation, pressing, filtering, or centrifugation.

In some embodiments, melt processing is performed by extruders, mixers, kneaders, or compounders. Suitable melt process operations are available from commercial sources such as Leitritz Advanced Technologies Corporation (Somerville, NJ), Krauss-Maffei Bertsdorff (Florence, KY), C.W. Brabender Instruments Incorporated (South Hackensack, NJ), Farrell Corporation (Ansonia, CT), LIST Technology AG (Arisdorf, Switzerland), and Buss USA (Carol Stream, IL).

In some embodiments, the formed nanocomposite blend comprises an optical film. The optical films have been discussed in detail above. As was mentioned above, the optical film articles may be monolithic (that is to say they may comprise just the nanocomposite blend) or they may be multi-layer optical film articles. Additionally, the formed nanocomposite blend may be in a variety of three dimensional shapes.

The nanocomposite blend articles and devices of this disclosure are further illustrated in the Figures.

FIG. 1 is a schematic diagram side elevation view of an illustrative flexible display film article 30. Article 30 comprises the flexible display film 10 which comprises a transparent elastomeric nanocomposite blend layer 14.

The flexible display film 10 may have a haze value of 10% or less. In some embodiments, the flexible display film 10 may have a haze value of 5% or less, 4% or less, or 3% or less. The flexible display film 10 may have a clarity of 95% or greater, or 97% or greater. The flexible display film 10 may have a visible light transmission of 85% or greater, or 90% or greater, or 93% or greater.

The flexible display film 10 may be nominally colorless, having a yellow index or b* value of 5 or less, or 4 or less, or 3 or less, or 2 or less, or 1 or less. In many embodiments, the display film 10 may have a yellow index or b* value of 1 or less.

After at least 100,000 bending or folding cycles about a 3 millimeter (mm) radius, the flexible display film 10 may maintain a haze value of 5% or less. After at least 100,000 bending or folding cycles about a 5 mm radius, or about a 4 mm radius, or about a 3 mm radius, or about a 2 mm radius, or about a 1 mm radius, the flexible display film 10 may maintain a stable haze value, or remain intact without cracking or delaminating.

After at least 100,000 bending or folding cycles about a 3 mm radius or less, the flexible display film 10 may remain intact.

The flexible display film 10 may have any useful thickness. In many embodiments, the flexible display film 10 has a thickness of 500 micrometers or less, or 400 micrometers or less, or 300 micrometers or less, or 200 micrometers or less. The thickness of the flexible display film 10 is a balance between being thick enough to provide the desired display protection and thin enough to provide the folding and reduced thickness design parameters.

Figure 2:
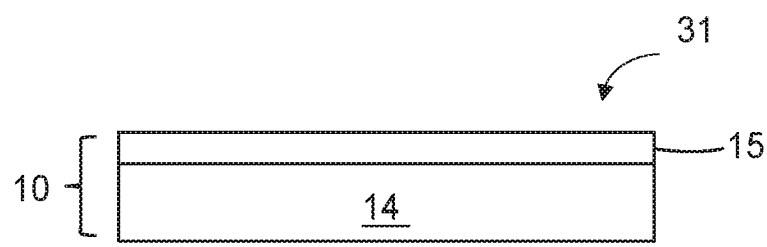
FIG. 2 is a schematic diagram side elevation view of another illustrative flexible optical film of this disclosure.

FIG. 2 is a schematic diagram side elevation view of an illustrative flexible display film article 31. Article 31 comprises the flexible display film 10 which comprises a transparent elastomeric nanocomposite blend layer 14 and a transparent functional coating layer 15.

The transparent functional coating layer 15 may be an abrasion resistant hardcoat, or conductive layer for touch sensitive display elements, or barrier layer to mitigate or slow ingress of oxygen or water through the flexible display film 10. Transparent barrier layers may include for example, thin alternating layers of silica, alumina or zirconia together with an organic resin. Exemplary transparent barrier layers are described in U.S. Pat. No. 7,980,910 and PCT Publication No. WO 2003/094256.

Other transparent functional coating layers 15 include a microstructure layer, a slip agent layer, an anti-glare layer, an anti-reflective layer, or an anti-fingerprint layer. Additional transparent functional coating layers 15 may be disposed in the interior of the display film. One useful transparent functional coating layer 15 disposed within the flexible display film 10 is a sparkle reduction layer as described in PCT Publication No. WO 2015/191949. The sparkle reduction layer may be particularly useful with high definition displays that include anti-glare coatings.

Figure 3:
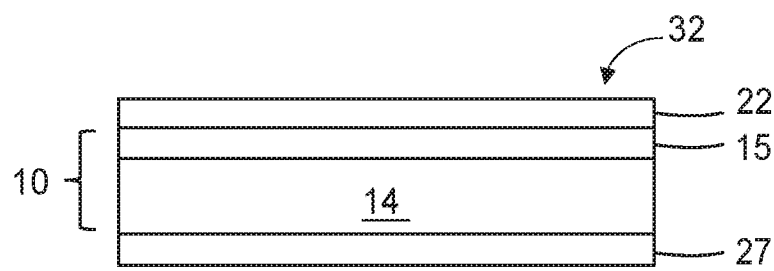
FIG. 3 is a schematic diagram side elevation view of another illustrative flexible optical film of this disclosure.

FIG. 3 is a schematic diagram side elevation view of an illustrative flexible display film article 32. Article 32 comprises the flexible display film 10, wherein the flexible display film 10 comprises a transparent elastomeric nanocomposite blend layer 14 and a transparent functional coating layer 15, and wherein removable liners 22 and 27 offer transport protection to the underlying flexible display film 10.

Figure 4:
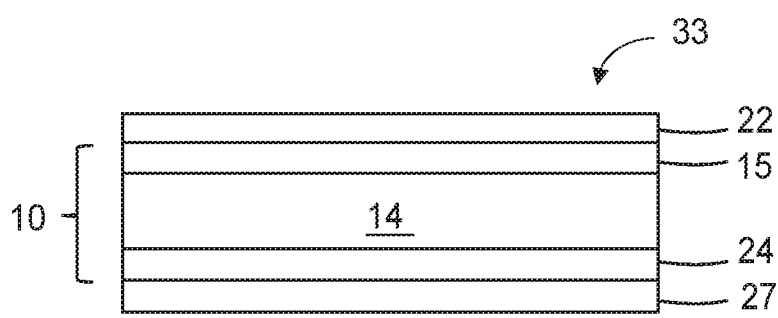
FIG. 4 is a schematic diagram side elevation view of another illustrative flexible optical film of this disclosure.

FIG. 4 is a schematic diagram side elevation view of an illustrative flexible display film article 33. Article 33 comprises the flexible display film 10, wherein the flexible display film 10 comprises a transparent elastomeric nanocomposite blend layer 14, a transparent functional coating layer 15, and a transparent adhesive layer 24, and wherein removable liners 22 and 27 offer transport protection to the underlying flexible display film 10.

Figure 5:
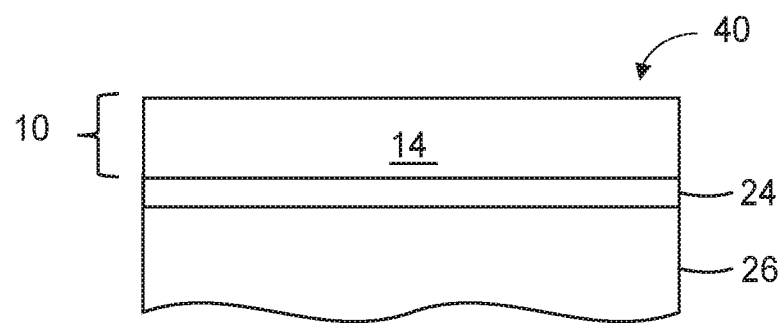
FIG. 5 is a schematic diagram side elevation view of an illustrative flexible optical film on an optical display forming an article of this disclosure.

FIG. 5 is a schematic diagram side elevation view of an illustrative flexible display film 10 on an optical element 26 forming article 40. The flexible display film 10 includes a transparent elastomeric nanocomposite blend layer 14. A transparent adhesive layer 24 adheres the flexible display film 10 to the optical element 26. In some cases, the transparent adhesive layer 24 permanently fixes the flexible display film 10 to the optical element 26. In some cases, the flexible display film 10 and adhesive layer 24 can be removed/debonded/repositioned, relative to the optical element 26, the application of heat or mechanical force such that the flexible display film is replaceable or repositioned by the consumer.

Figure 6:
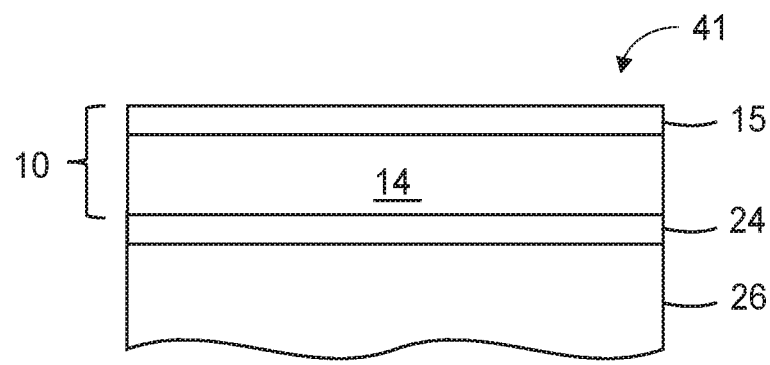
FIG. 6 is a schematic diagram side elevation view of another illustrative optical film on an optical display forming an article of this disclosure.

FIG. 6 is a schematic diagram side elevation view of an illustrative flexible display film 10 on an optical element 26 forming an article, 41. The flexible display film 10 includes a transparent elastomeric nanocomposite blend layer 14 and a transparent functional coating layer 15. A transparent adhesive layer 24 adheres the flexible display film 10 to the optical element 26. In some cases, the transparent adhesive layer 24 permanently fixes the flexible display film 10 to the optical element 26. In some cases, the flexible display film 10 and adhesive layer 24 can be removed/debonded/repositioned, relative to the optical element 26, the application of heat or mechanical force such that the flexible display film is replaceable or repositioned by the consumer.

Figure 7:
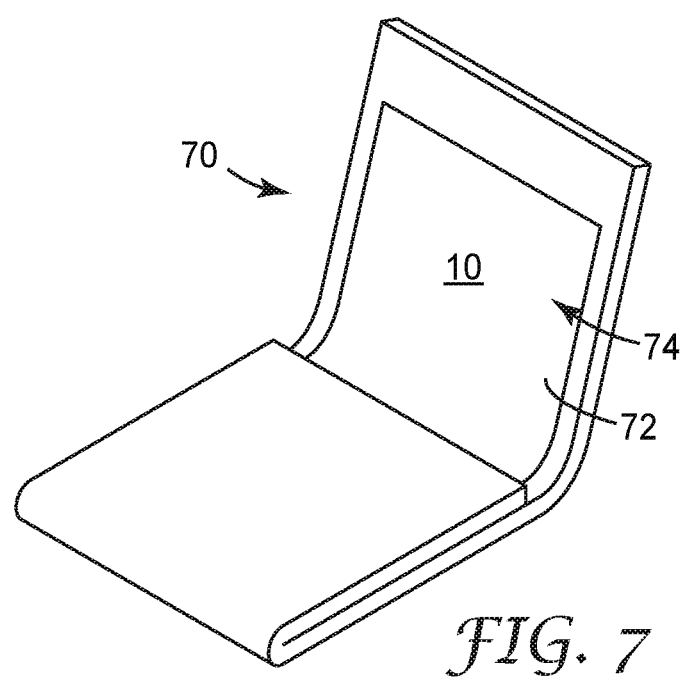
FIG. 7 is a schematic diagram perspective view of an illustrative folding article including an illustrative flexible optical film of this disclosure.

FIG. 7 is a schematic diagram perspective view of an illustrative folding display device 70 including an illustrative flexible display film 10. The flexible display film 10 may be any of the display film constructions described herein disposed on an optical element such as an optical display 74. The display device 70 may not be a folding article and may only flex within a certain range, or may be a static curved display device.

An optical display 74 may form at least a portion of display device. The display device 70 may include a display window 72. The display device 70 can be any useful article such as a phone or smartphone, electronic tablet, electronic notebook, computer, and the like. The optical display may include an organic light emitting diode (OLED) display panel. The optical display may include a liquid crystal display (LCD) panel or a reflective display. Examples of reflective displays include electrophoretic displays, electrofluidic displays (such as an electrowetting display), interferometric displays or electronic paper display panels, and are described in US Patent Publication No. 2015/0330597. Further examples of optical displays include static display such as commercial graphic signs and billboards.

The flexible display film 10 and the optical display 74 may be foldable so that the optical display 74 faces itself and at least a portion of display film 10 contacts or directly faces another portion of the flexible display film 10, as illustrated in FIG. 7. The flexible display film 10 and the optical display 74 may be flexible or bendable or rollable or foldable so that a portion of the display film 10 and the optical display 74 can articulate relative to another portion of the flexible display film 10 and the optical display 74. The display film 10 and the optical display 74 may be flexible or bendable or rollable or foldable so that a portion of the flexible display film 10 and the optical display 74 can articulate at least 90 degrees or at least 170 degrees relative to another portion of the display film 10 and the optical display 74.

The flexible display film 10 and the optical display 74 may be flexible or bendable or rollable or foldable so that a portion of the display film 10 and the optical display 74 can articulate relative to another portion of the flexible display film 10 and optical display 74 to form a bend radius of 3 mm or less in the display film 10 at the bend or fold line. The flexible display film 10 and the optical display 74 may be flexible or bendable or rollable or foldable so that a portion of the flexible display film 10 and optical display 74 can articulate relative to another portion of the display film 10 and the optical display 74 to form a bend radius such that the flexible display film 10 overlaps itself and is separated from each other by a distance on 10 mm or less, or 6 mm or less or 3 mm or less or contacts each other. While FIG. 7 shows the display device 74 folding inward, where the surface of the display film 10 approach each other, there are other cases in which the display device may fold in the opposite or outward direction (out-folding) such that the flexible display film 10 is on the outer surface of the display device.

This disclosure includes the following embodiments:

Among the embodiments are nanocomposite blends. Embodiment 1 is a nanocomposite blend comprising: a first (meth)acrylic polymer or copolymer comprised of monomers selected from the group consisting of methacrylic acid and acrylic acid; a second (meth)acrylic polymer or copolymer comprised of monomers selected from the group consisting of methacrylic acid and acrylic acid; and surface-modified metal oxide nanoparticles, wherein the surface-modified metal oxide nanoparticles are surface modified with a surface modifying agent comprising a carboxylic acid silane of Formula 1:

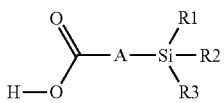

Formula 1 wherein R1 is a $C_1$ to $C_{10}$ alkoxy group; and R2 and R3 are independently selected from the group consisting of $C_1$ to $C_{10}$ alkyl and $C_1$ to $C_{10}$ alkoxy groups; and A is a linker group selected from the group consisting of $C_1$ to $C_{10}$ alkylene or arylene groups, $C_1$ to $C_{10}$ aralkylene groups, $C_2$ to $C_{16}$ heteroalkylene or heteroarylene groups, and $C_2$ to $C_{16}$ amide containing groups.

Embodiment 2 is the nanocomposite blend of embodiment 1, wherein at least one of the first and second (meth) acrylic polymer or copolymer comprises a copolymer comprising at least one additional monomer selected from the group consisting of ethylene, propylene, alkyl(meth)acrylates, aryl(meth)acrylates, alkaryl(meth)acrylates, acrylonitrile, and carbon monoxide.

Embodiment 3 is the nanocomposite blend of embodiment 3, wherein the at least one additional monomer comprises ethylene, propylene or a combination thereof.

Embodiment 4 is the nanocomposite blend of any of embodiments 1-3, wherein the first and second (meth)acrylic polymers or copolymers are at least partially neutralized with sodium cations, calcium cations, potassium cations, zinc cations, lithium cations, magnesium cations, aluminum cations, or a combination thereof.

Embodiment 5 is the nanocomposite blend of any of embodiments 2-4, wherein the (meth)acrylic monomer is present in an amount of at least 14% by weight.

Embodiment 6 is the nanocomposite blend of embodiment 5, wherein the difference in the (meth)acrylic acid monomer in the first and second copolymer is less than 6% by weight.

Embodiment 7 is the nanocomposite blend of any of embodiments 2-6, wherein the additional monomer comprises ethylene or propylene.

Embodiment 8 is the nanocomposite blend of embodiment 7, wherein at least one of the first and second (meth) acrylic copolymers further comprises at least one third monomer selected from the group consisting of n-butyl acrylate, isobutyl acrylate, isopropyl acrylate, n-propyl acrylate, ethyl acrylate, methyl acrylate, 2-ethylhexyl acrylate, iso-octyl acrylate and methyl methacrylate.

Embodiment 9 is the nanocomposite blend of any of embodiments 1-8, wherein the concentration of the surface-modified metal oxide nanoparticles is 1 to 70% by weight.

Embodiment 10 is the nanocomposite blend of any of embodiments 1-8, wherein the concentration of the surface-modified metal oxide nanoparticles is 5 to 60% by weight.

Embodiment 11 is the nanocomposite blend of any of embodiments 1-8, wherein the concentration of the surface-modified metal oxide nanoparticles is 10 to 50% by weight.

Embodiment 12 is the nanocomposite blend of any of embodiments 1-11, wherein the surface-modified metal oxide nanoparticles have an average diameter of from 1 nanometers to 200 nanometers.

Embodiment 13 is the nanocomposite blend of any of embodiments 1-11, wherein the surface-modified metal oxide nanoparticles have an average diameter of from 4 nanometers to 190 nanometers.

Embodiment 14 is the nanocomposite blend of any of embodiments 1-11, wherein the surface-modified metal oxide nanoparticles have an average diameter of from 4 nanometers to 100 nanometers.

Embodiment 15 is the nanocomposite blend of any of embodiments 1-11, wherein the surface-modified metal oxide nanoparticles have an average diameter of from 4 nanometers to 75 nanometers.

Embodiment 16 is the nanocomposite blend of any of embodiments 1-11, wherein the surface-modified metal oxide nanoparticles have an average diameter of from 10 nanometers to 50 nanometers.

Embodiment 17 is the nanocomposite blend of any of embodiments 1-11, wherein the surface-modified metal oxide nanoparticles have an average diameter of from 20 nanometers to 50 nanometers.

Embodiment 18 is the nanocomposite blend of any of embodiments 1-17, wherein the surface-modified metal oxide nanoparticles comprise surface-modified nanoparticles of a metal oxide of silicon, titanium, aluminum, hafnium, zinc, tin, cerium, yttrium, indium, antimony, or mixed metal oxides thereof.

Embodiment 19 is the nanocomposite blend of embodiment 18, wherein the surface-modified metal oxide nanoparticles comprise surface-modified silica particles.

Embodiment 20 is the nanocomposite blend of any of embodiments 1-19, wherein the carboxylic acid silane is produced by reaction of an organic acid anhydride and amino alkyl trialkoxy silane.

Embodiment 21 is the nanocomposite blend of embodiment 20, wherein the organic acid silane is succinic anhydride.

Embodiment 22 is the nanocomposite blend of embodiment 20, wherein the amino alkyl trialkoxy silane is 3-aminopropyltrimethoxysilane.

Embodiment 23 is the nanocomposite blend of any of embodiments 1-22, wherein the nanocomposite comprises an article in the form of a film, a sheet, a filament, particles, pellets, flakes, or a formed article.

Also disclosed are optical film articles. Embodiment 24 is an optical film article comprising: at least one layer of a polymer nanocomposite blend, wherein the polymer nanocomposite blend comprises: a first (meth)acrylic polymer or copolymer comprised of monomers selected from the group consisting of methacrylic acid and acrylic acid; a second (meth)acrylic polymer or copolymer comprised of monomers selected from the group consisting of methacrylic acid and acrylic acid; and surface-modified metal oxide nanoparticles, wherein the surface-modified metal oxide nanoparticles are surface modified with a surface modifying agent comprising a carboxylic acid silane of Formula 1:

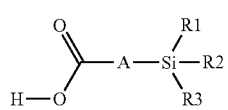

Formula 1 wherein R1 is a $C_1$ to $C_{10}$ alkoxy group; and R2 and R3 are independently selected from the group consisting of $C_1$ to $C_{10}$ alkyl and $C_1$ to $C_{10}$ alkoxy groups; and A is a linker group selected from the group consisting of $C_1$ to $C_{10}$ alkylene or arylene groups, $C_1$ to $C_{10}$ aralkylene groups, $C_2$ to $C_{16}$ heteroalkylene or heteroarylene groups, and $C_2$ to $C_{16}$ amide containing groups.

Embodiment 25 is the optical film article of embodiment 24, wherein the optical film article is flexible, bendable, rollable, foldable, or formable.

Embodiment 26 is the optical film article of embodiment 24 or 25, wherein at least one of first and second (meth)acrylic polymers or copolymers comprises a copolymer comprising at least one additional monomer selected from the group consisting of ethylene, propylene, alkyl(meth)acrylates, aryl(meth)acrylates, alkaryl(meth)acrylates, acrylonitrile, and carbon monoxide.

Embodiment 27 is the optical film article of embodiment 26, wherein the at least one additional monomer comprises ethylene, propylene or a combination thereof.

Embodiment 28 is the optical film article of any of embodiments 24-27, wherein the (meth)acrylic polymers are at least partially neutralized with sodium cations, calcium cations, potassium cations, zinc cations, lithium cations, magnesium cations, aluminum cations, or a combination thereof.

Embodiment 29 is the optical film article of any of embodiments 26-28, wherein the (meth)acrylic monomer is present in an amount of at least 14% by weight.

Embodiment 30 is the optical film article of embodiment 29, wherein the difference in the (meth)acrylic acid monomer in the first and second copolymer is less than 6% by weight.

Embodiment 31 is the optical film article of any of embodiments 26-30, wherein the additional monomer comprises ethylene or propylene.

Embodiment 32 is the optical film article of embodiment 31, wherein at least one of the first and second (meth)acrylic copolymers further comprises at least one third monomer selected from the group consisting of n-butyl acrylate, isobutyl acrylate, isopropyl acrylate, n-propyl acrylate, ethyl acrylate, methyl acrylate, 2-ethylhexyl acrylate, iso-octyl acrylate and methyl methacrylate.

Embodiment 33 is the optical film article of any of embodiments 24-32, wherein the concentration of the surface-modified metal oxide nanoparticles is 1 to 70% by weight.

Embodiment 34 is the optical film article of any of embodiments 24-32, wherein the concentration of the surface-modified metal oxide nanoparticles is 5 to 60% by weight.

Embodiment 35 is the optical film article of any of embodiments 24-32, wherein the concentration of the surface-modified metal oxide nanoparticles is 10 to 50% by weight.

Embodiment 36 is the optical film article of any of embodiments 24-35, wherein the surface-modified metal oxide nanoparticles have an average diameter of from 1 nanometers to 200 nanometers.

Embodiment 37 is the optical film article of any of embodiments 24-35, wherein the surface-modified metal oxide nanoparticles have an average diameter of from 4 nanometers to 190 nanometers.

Embodiment 38 is the optical film article of any of embodiments 24-35, wherein the surface-modified metal oxide nanoparticles have an average diameter of from 4 nanometers to 100 nanometers.

Embodiment 39 is the optical film article of any of embodiments 24-35, wherein the surface-modified metal oxide nanoparticles have an average diameter of from 4 nanometers to 75 nanometers.

Embodiment 40 is the optical film article of any of embodiments 24-35, wherein the surface-modified metal oxide nanoparticles have an average diameter of from 10 nanometers to 50 nanometers.

Embodiment 41 is the optical film article of any of embodiments 24-35, wherein the surface-modified metal oxide nanoparticles have an average diameter of from 20 nanometers to 50 nanometers.

Embodiment 42 is the optical film article of any of embodiments 24-41, wherein the surface-modified metal oxide nanoparticles comprise surface-modified nanoparticles of a metal oxide of silicon, titanium, aluminum, hafnium, zinc, tin, cerium, yttrium, indium, antimony, or mixed metal oxides thereof.

Embodiment 43 is the optical film article of embodiment 42, wherein the surface-modified metal oxide nanoparticles comprise surface-modified silica particles.

Embodiment 44 is the optical film article of any of embodiments 24-43, wherein the carboxylic acid silane is produced by reaction of an organic acid anhydride and amino alkyl trialkoxy silane.

Embodiment 45 is the optical film article of embodiment 44, wherein the organic acid silane is succinic anhydride.

Embodiment 46 is the optical film article of embodiment 44, wherein the amino alkyl trialkoxy silane is 3-aminopropyltrimethoxysilane.

Embodiment 47 is the optical film article of any of embodiments 24-46, wherein the optical film article is a multi-layer optical film article.

Embodiment 48 is the optical film article of embodiment 47, wherein in the multi-layer optical film article further comprises at least one additional layer comprising a transparent functional coating layer, a transparent adhesive layer, and one or more removable layers.

Embodiment 49 is the optical film article of embodiment 48, wherein the transparent functional coating comprises a hardcoat layer, a conductive layer, a barrier layer, microstructure layer, a slip agent layer, an anti-glare layer, an anti-reflective layer, an anti-fingerprint layer, or an anti-sparkle layer.

Embodiment 50 is the optical film article of any of embodiments 24-49, wherein the optical film article is optically transparent.

Embodiment 51 is the optical film article of embodiment 50, wherein optical film article is nominally colorless.

Embodiment 52 is the optical film article of embodiment 50 or 51, wherein the optical film article has a luminous transmission of greater than 85%, and a haze value of less than 10%.

Also disclosed herein are optical articles. Embodiment 53 is an optical article comprising: a display device; and an optical film article in contact with a surface of the display device, wherein the optical film article comprises a flexible, bendable, rollable, foldable, or formable optical film comprising at least one layer of a polymer nanocomposite blend, wherein the polymer nanocomposite blend comprises: a first (meth)acrylic polymer or copolymer comprised of monomers selected from the group consisting of methacrylic acid and acrylic acid; a second (meth)acrylic polymer or copolymer comprised of monomers selected from the group consisting of methacrylic acid and acrylic acid; and surface-modified metal oxide nanoparticles, wherein the surface-modified metal oxide nanoparticles are surface modified with a surface modifying agent comprising a carboxylic acid silane of Formula 1:

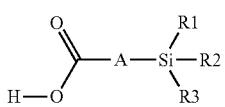

Formula 1 wherein R1 is a $C_1$ to $C_{10}$ alkoxy group; and R2 and R3 are independently selected from the group consisting of $C_1$ to $C_{10}$ alkyl and $C_1$ to $C_{10}$ alkoxy groups; and A is a linker group selected from the group consisting of $C_1$ to $C_{10}$ alkylene or arylene groups, $C_1$ to $C_{10}$ aralkylene groups, $C_2$ to $C_{16}$ heteroalkylene or heteroarylene groups, and $C_2$ to $C_{16}$ amide containing groups.

Embodiment 54 is the optical article of embodiment 53, wherein the optical article comprises a display device with a formed optical film article, wherein the formed optical film article is a molded optical film article.

Embodiment 55 is the optical article of embodiment 53 or 54, wherein at least one of first and second (meth)acrylic polymers or copolymers comprises a copolymer comprising at least one additional monomer selected from the group consisting of ethylene, propylene, alkyl(meth)acrylates, aryl (meth)acrylates, alkaryl(meth)acrylates, acrylonitrile, and carbon monoxide.

Embodiment 56 is the optical article of embodiment 55, wherein the at least one additional monomer comprises ethylene, propylene or a combination thereof.

Embodiment 57 is the optical article of any of embodiments 53-56, wherein the (meth)acrylic polymers or copolymers are at least partially neutralized with sodium cations, calcium cations, potassium cations, zinc cations, lithium cations, magnesium cations, aluminum cations, or a combination thereof.

Embodiment 58 is the optical article of any of embodiments 53-57, wherein the (meth)acrylic monomer is present in an amount of at least 14% by weight.

Embodiment 59 is the optical article of embodiment 58, wherein the difference in the (meth)acrylic acid monomer in the first and second copolymer is less than 6% by weight.

Embodiment 60 is the optical article of any of embodiments 53-59, wherein the additional monomer comprises ethylene or propylene.

Embodiment 61 is the optical article of embodiment 60, wherein at least one of the (meth)acrylic copolymers further comprises at least one third monomer selected from the group consisting of n-butyl acrylate, isobutyl acrylate, isopropyl acrylate, n-propyl acrylate, ethyl acrylate, methyl acrylate, 2-ethylhexyl acrylate, iso-octyl acrylate and methyl methacrylate.

Embodiment 62 is the optical article of any of embodiments 53-61, wherein the concentration of the surface-modified metal oxide nanoparticles is 1 to 70% by weight.

Embodiment 63 is the optical article of any of embodiments 53-61, wherein the concentration of the surface-modified metal oxide nanoparticles is 5 to 60% by weight.

Embodiment 64 is the optical article of any of embodiments 53-61, wherein the concentration of the surface-modified metal oxide nanoparticles is 10 to 50% by weight.

Embodiment 65 is the optical article of any of embodiments 53-64, wherein the surface-modified metal oxide nanoparticles have an average diameter of from 1 nanometers to 200 nanometers.

Embodiment 66 is the optical article of any of embodiments 53-64, wherein the surface-modified metal oxide nanoparticles have an average diameter of from 4 nanometers to 190 nanometers.

Embodiment 67 is the optical article of any of embodiments 53-64, wherein the surface-modified metal oxide nanoparticles have an average diameter of from 4 nanometers to 100 nanometers.

Embodiment 68 is the optical article of any of embodiments 53-64, wherein the surface-modified metal oxide nanoparticles have an average diameter of from 4 nanometers to 75 nanometers.

Embodiment 69 is the optical article of any of embodiments 53-64, wherein the surface-modified metal oxide nanoparticles have an average diameter of from 10 nanometers to 50 nanometers.

Embodiment 70 is the optical article of any of embodiments 53-64, wherein the surface-modified metal oxide nanoparticles have an average diameter of from 20 nanometers to 50 nanometers.

Embodiment 71 is the optical article of any of embodiments 53-70, wherein the surface-modified metal oxide nanoparticles comprise surface-modified nanoparticles of a metal oxide of silicon, titanium, aluminum, hafnium, zinc, tin, cerium, yttrium, indium, antimony, or mixed metal oxides thereof.

Embodiment 72 is the optical article of embodiment 71, wherein the surface-modified metal oxide nanoparticles comprise surface-modified silica particles.

Embodiment 73 is the optical article of any of embodiments 53-72, wherein the carboxylic acid silane is produced by reaction of an organic acid anhydride and amino alkyl trialkoxy silane.

Embodiment 74 is the optical article of embodiment 73, wherein the organic acid silane is succinic anhydride.

Embodiment 75 is the optical article of embodiment 73, wherein the amino alkyl trialkoxy silane is 3-aminopropyltrimethoxysilane.

Embodiment 76 is the optical article of any of embodiments 53-75, wherein the optical film article is a multi-layer optical film article.

Embodiment 77 is the optical article of embodiment 76, wherein in the multi-layer optical film article further comprises at least one additional layer comprising a transparent functional coating layer, a transparent adhesive layer, and one or more removable layers.

Embodiment 78 is the optical article of embodiment 77, wherein the transparent functional coating comprises a hardcoat layer, a conductive layer, a barrier layer, microstructure layer, a slip agent layer, an anti-glare layer, an anti-reflective layer, an anti-fingerprint layer, or an anti-sparkle layer.

Embodiment 79 is the optical article of any of embodiments 53-78, wherein the optical film article is optically transparent.

Embodiment 80 is the optical article of embodiment 79, wherein optical film article is nominally colorless.

Embodiment 81 is the optical article of embodiment 79 or 80, wherein the optical film article has a luminous transmission of greater than 85%, and a haze value of less than 10%.

Also disclosed are methods of preparing optical articles. Embodiment 82 is a method of preparing an optical article comprising: preparing a nanocomposite blend, wherein preparing a nanocomposite blend comprises: (a) preparing of an aqueous nanodispersion of surface-modified metal oxide nanoparticles, wherein the surface of the metal oxide nanoparticles are modified with a carboxylic acid silane surface modifying agent; (b) preparing of an aqueous dispersion of at least two (meth)acrylic polymers or copolymers wherein the (meth)acrylic polymers or copolymers are at least partially neutralized; (c) combining the dispersions of (a) and (b) to form an aqueous nanodispersion of surface-modified metal oxide nanoparticles and (meth)acrylic polymers or copolymers; (d) drying and/or concentrating the nanodispersion of (c); and (e) melt processing the dried and/or concentrated nanodispersion (d) to form a nanocomposite blend of surface-modified metal oxide nanoparticles and (meth)acrylic polymers or copolymers, wherein the surface of the metal oxide nanoparticles is modified with a carboxylic acid silane surface modifying agent, and the (meth) acrylic polymers or copolymers are at least partially neutralized.

The method of embodiment 82, wherein the formed nanocomposite blend comprises an optical film article of any of embodiments 24-52.

The method of embodiment 83, further comprising contacting the optical film article to a surface of a display article to form an optical article of any of embodiments 53-81.

Embodiment 84 is a method of preparing an optical article comprising: preparing a nanocomposite blend, wherein preparing a nanocomposite blend comprises: (a) preparing of an aqueous nanodispersion of surface-modified metal oxide nanoparticles, wherein the surface of the metal oxide nanoparticles are modified with a carboxylic acid silane surface modifying agent; (b) preparing of an aqueous dispersion of a first (meth)acrylic polymer or copolymer wherein the (meth)acrylic polymer or copolymer is at least partially neutralized; (c) combining the dispersions of (a) and (b) to form an aqueous nanodispersion of surface-modified metal oxide nanoparticles and first (meth)acrylic polymer or copolymer; (d) drying and/or concentrating the nanodispersion of (c); and (e) melt processing the dried and/or concentrated nanodispersion (d) and a second (meth)acrylic polymer or copolymer to form a nanocomposite blend of surface-modified metal oxide nanoparticles and (meth)acrylic polymers or copolymers, wherein the surface of the metal oxide nanoparticles is modified with a carboxylic acid silane surface modifying agent, and the (meth)acrylic polymers or copolymers are at least partially neutralized.

Embodiment 85 is the method of embodiment 84, wherein the formed nanocomposite blend comprises an optical film article ofany ofembodiments 24-52.

Embodiment 86 is the method of embodiment 84, further comprising contacting the optical film article to a surface of a display article to form an optical article of any of embodiments 53-81.

EXAMPLES

The Examples illustrate nanocomposite blend compositions of surface-modified metal oxide nanoparticles, namely silica, and (meth)acrylic acid copolymers.

TABLE 1

Materials

| Material | Description | Supplier |
|---|---|---|
| ASN | Aqueous colloidal Silica Nanodispersion of "NALCO 2327". | Nalco Co. (Naperville, IL) |
| SA | succinic anhydride | Alfa Aesar (Ward Hill, MA) |
| NaOH | sodium hydroxide | Millipore Sigma (Burlington, MA) |
| AMINO-TMOS | 3-aminopropyltrimethoxysilane | Gelest, Inc. (Morrisville, PA) |
| DMF | N,N-dimethylformamide | OmniSolv (Billerica, MA) |
| DI $H_2O$ | deionized water | 3M laboratory (St. Paul, MN) |
| MP-1 | (Meth)acrylic Polymer-1, poly(ethylene-co-acrylic acid) of "PRIMACOR 5980i" | Dow Chemical Co. (Midland, MI) |
| MP-2 | (Meth)acrylic Polymer-2, poly(ethylene-co-acrylic acid) of "PRIMACOR 1410" | Dow Chemical Co. (Midland, MI) |
| MP-3 | (Meth)acrylic Polymer-3, poly(ethylene-co-methacrylic acid) of "NUCREL 699" | DuPont (Wilmington, DE) |
| MP-4 | (Meth)acrylic Polymer-4, poly(ethylene-co-methacrylic acid) of "NUCREL 960" | DuPont |
| MP-5 | (Meth)acrylic Polymer-5, poly(ethylene-co-methacrylic acid) w/ $Na^+$ ions of "SURLYN 1601" | DuPont |
| MP-6 | (Meth)acrylic Polymer-6, poly(ethylene-co-methacrylic acid) w/ $Zn^{++}$ ions of "SURLYN 1706" | DuPont |
| MP-7 | (Meth)acrylic Polymer-7, poly(ethylene-co-methacrylic acid) w/ $Na^+$ ions of "SURLYN 1707" | DuPont |
| MP-8 | (Meth)acrylic Polymer-8, poly(ethylene-co-methacrylic acid) w/ $Li^+$ ions of "SURLYN 7940" | DuPont |
| MP-9 | (Meth)acrylic Polymer-9, poly(ethylene-co-methacrylic acid-co-acrylate) w/ $Zn^{++}$ ions of "SURLYN 9020" | DuPont |
| MP-10 | (Meth)acrylic Polymer-10, poly(ethylene-co-methacrylic acid) w/ $Zn^{++}$ ions of "SURLYN 9120" | DuPont |
| MP-11 | (Meth)acrylic Polymer-11, poly(ethylene-co-methacrylic acid) w/ $Na^+$ ions of "SURLYN PC-350" | DuPont |
| MP-12 | (Meth)acrylic Polymer-12, poly(ethylene-co-methacrylic acid-co-acrylate) w/ $Mg^{++}$ ions of "HPF 1000" | DuPont |

PREPARATIVE EXAMPLES

PE-1: Preparation of Surface-modified Silica Nanoparticles

Step 1A: Preparation of Carboxylic Acid Silane:

71 grams of N,N-dimethylformamide (DMF) was placed in an 8 ounce clear glass jar. A Teflon coated stir bar was added to the jar. The jar was placed on a stir plate and stirring initiated. 17.8 grams of succinic anhydride (SA) was added to the jar. The SA dissolved in the DMF within 10 minutes. 128 grams of DMIF was placed in a separate 8 ounce clear glass jar. A Teflon coated stir bar was added to the jar. The jar was placed on a stir plate and stirring initiated. 32 grams of 3-aminopropyltrimethoxysilane (AMMNO-TMOS) was added to the jar. The AMINO-TMOS readily dissolved in the DMIF. The SA/DMF solution was transferred to a 16 ounce clear glass jar. A Teflon coated stir bar was added to the jar, the jar was placed on a stir plate, and stirring initiated. The AMINO-TMOS/DMIF solution was slowly added to the SA/DMVF solution. The solution was continuously stirred at room temperature for 24 hours to complete the synthesis of the carboxylic acid silane which was confirmed by NMR. Reaction Scheme 1 summarizes the reaction chemistry to synthesize the carboxylic acid silane.

Step 1B: Preparation of Carboxylic Acid Silane:

2,500 grams of DMF was placed in a 4 liter brown glass jug. A Teflon coated stir bar was added to the jug, the jug was placed on a stir plate, and stirring initiated. 250 grams of SA was added to the jug which dissolved in the DMF. 400 grams of AMINO-TMOS was slowly added to the jug. The solution in the jug was continuously stirred for 24 hours at room temperature to complete synthesis of the carboxylic acid silane which was confirmed by NMR.

Reaction Scheme 1

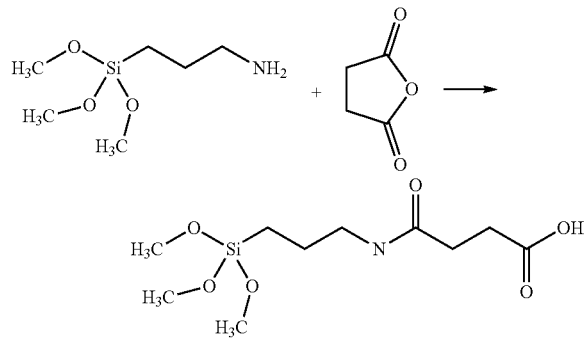

Step 1C: Preparation of Carboxylic Acid Modified Silica Nanoparticles:

400 grams of aqueous silica nanodispersion (ASN) was placed in a 32 ounce clear glass jar. The nanodispersion contained nominally 40 weight percent spherical surface unmodified silica nanoparticles of nominally 20 nanometer diameter. A Teflon coated stir bar was added to the jar. The jar was placed on a stir plate and stirring initiated. 351.1 grams of deionized water (DI $H_2O$) was slowly added to the jar. 123.6 grams of carboxylic acid silane/DMF solution prepared as described in Step 1A above was slowly added to the jar, and stirring continued for an additional 20 minutes. The stir bar was removed, and the jar was sealed and placed in a preheated 80° C. oven for 24 hours to complete the carboxylic acid surface modification of the silica nanoparticles and form a nanodispersion of surface-modified silica nanoparticles.

Step 1D: Preparation of Carboxylic Acid Modified Silica Nanoparticles: 650 grams of ASN was placed in a 32 ounce clear glass jar. A Teflon coated stir bar was added to the jar. The jar was placed on a stir plate and stirring initiated. 198.7 grams of carboxylic acid silane/DMF solution prepared as described in Step 1B above was slowly added to the jar, and stirring continued for an additional 20 minutes. The stir bar was removed, and the jar was sealed and placed in a preheated 80° C. oven for 24 hours to complete carboxylic acid surface modification of the silica nanoparticles and form a nanodispersion of surface-modified silica nanoparticles.

PE-2: Preparation of (meth)acrylic Aqueous Dispersion

Step 2A: Preparation of NaOH Stock Solution:

3,000 grams of DI $H_2O$ was placed in a 1 gallon clear glass jar. A Teflon coated stir bar was added to the jar. The jar was placed on a stir plate and stirring initiated. 1,167 grams of sodium hydroxide (NaOH) was incrementally added to the jar. The NaOH pellets dissolved in the water forming a clear solution. The Teflon coated stir bar was removed from the jar.

Step 2B: Preparation of 5 wt % (Meth)acrylic Polymer MP-1 Aqueous Dispersion:

1,403 grams of DI $H_2O$ was placed in a 2 liter glass reaction flask. 22 grams of 28 w % NaOH solution as described in Step 2A above was added to the flask. Stirring was initiated and 75 grams of MP-1 was added to the flask. The reaction flask which was equipped with a reflux column was heated to 100° C. Within 2.5 hours, the MP-1 pellets dissolved in the basic water solution to form a clear dispersion. The MP-1 dispersion was filtered through a 200 micrometer filter.

Step 2C: Preparation of 15 wt % (Meth)acrylic Polymer MP-1 Aqueous Dispersion:

1,208 grams of DI $H_2O$ was placed in a 2 liter glass reaction flask. 67 grams of 28 w % NaOH solution as described in Step 2A above was added to the flask. Stirring was initiated and 225 grams of MP-1 was added to the flask. The reaction flask which was equipped with a reflux column was heated to 100° C. Within 2.5 hours, the MP-1 pellets dissolved in the basic water solution to form a clear dispersion. The MP-1 dispersion was filtered through a 200 micrometer filter.

Step 2D: Preparation of 25 wt % (Meth)acrylic Polymer MP-1 Aqueous Dispersion:

1,013 grams of DI $H_2O$ was placed in a 2 liter glass reaction flask. 112 grams of 28 w % NaOH solution as described in Step 2A above was added to the flask. Stirring was initiated and 375 grams of MP-1 was added to the flask. The reaction flask which was equipped with a reflux column was heated to 100° C. Within 2.5 hours, the MP-1 pellets dissolved in the basic water solution to form a clear dispersion. The MP-1 dispersion was filtered through a 200 micrometer filter.

Step 2E: 15 wt % (Meth)acrylic Polymer MP-1 Aqueous Dispersion:

27.6 kilograms of DI $H_2O$ has placed in a 3.785 liter stainless stain reactor. 5.1 kilograms of pellets of MP-1 was added to the reactor. Stirring was initiated. 1.5 kilograms of 28% NaOH solution as described in Step 2A was added to the reactor.

Stirring was increased from 30 to 60 revolutions per minute. The kettle was sealed and contents of the reactor were heated to 100° C. Within 2.5 hours, the MP-1 pellets dissolved in the basic water solution to form a clear dispersion. The MP-1 aqueous dispersion was filtered through a 200 micron filter.

Step 2F: 15% (Meth)acrylic Polymer Blend of MP-1 and MP-10 Aqueous Dispersion:

27.6 kilograms of DI H$_2$O has placed in a 3.785 liter stainless stain reactor. 5.1 kilograms of pellets of MP-1 was added to the reactor. 2.9 kilograms of pellets of MP-10 was added to the reactor. Stirring was initiated. 1.5 kilograms of 28% NaOH solution as described in Step 2A was added to the reactor. Stirring was increased from 30 to 60 revolutions per minute. The kettle was sealed and contents of the reactor were heated to 150° C. Within 2.5 hours, the MP-1 and MP-10 pellets dissolved in the basic water solution to form a milky white dispersion. The MP-1/MP-10 aqueous dispersion was filtered through a 200 micron filter.

Preparation of Nanodispersions:

Step 3A: 10/90 Surface-modified Nanoparticles/MP-1 Nanodispersion:

600 grams of MP-1 dispersion at 15 w % copolymer as described in Step 2C above was placed in a 32 ounce clear glass jar. 53 grams of silica nanodispersion at 18.8 w % nanoparticles as described in Step 1C above was added to the jar. The MP dispersion and silica nanodispersion readily mixed to form a nanodispersion.

Step 3B: 20/80 Surface-modified Nanoparticles/MP-1 Nanodispersion:

533 grams of MP-1 dispersion at 15 w % copolymer as described in Step 2C above was placed in a 32 ounce clear glass jar. 106 grams of silica nanodispersion at 18.8 w % nanoparticles as described in Step 1C above was added to the jar. The MP aqueous dispersion and silica nanodispersion readily mixed to form a nanodispersion.

Step 3C: 30/70 Surface-modified Nanoparticles/MP-1 Nanodispersion:

467 grams of MP-1 dispersion at 15 w % copolymer as described in Step 2C above was placed in a 32 ounce clear glass jar. 160 grams of silica nanodispersion at 18.8 w % nanoparticles as described in Step 1C was added to the jar. The MP dispersion and silica nanodispersion readily mixed to form a nanodispersion.

Step 3D: 40/60 Surface-modified Nanoparticles/MP-1 Nanodispersion:

400 grams of MP-1 dispersion at 15 w % copolymer as described in Step 2C above was placed in a 32 ounce clear glass jar. 213 grams of silica nanodispersion at 18.8 w % nanoparticles as described in Step 1C above was added to the jar. The MP dispersion and silica nanodispersion readily mixed to form a nanodispersion.

Step 3E: 50/50 Surface-modified Nanoparticles/MP-1 Nanodispersion:

333 grams of MP-1 dispersion at 15 w % copolymer as described in Step 2C above was placed in a 32 ounce clear glass jar. 266 grams of silica nanodispersion at 18.8 w % nanoparticles as described in Step 1C above was added to the jar. The MP dispersion and silica nanodispersion readily mixed to form a nanodispersion.

Step 3F: 60/40 Surface-modified Nanoparticles/MP-1 Nanodispersion:

257 grams of MP-1 dispersion at 15 w % copolymer as described in Step 2C above was placed in a 32 ounce clear glass jar. 319 grams of silica nanodispersion at 18.8 w % nanoparticles as described in Step 1C above was added to the jar. The MP dispersion and silica nanodispersion readily mixed to form a nanodispersion.

Preparation of Nanocomposites:

Comparative Example CE-1: MP-1 Polymer 30 grams of MP was melt processed in batch mode using a model D-51 Plasti-corder (C.W. Brabender Instruments, Inc., South Hackensack, NJ) at 75 rpm and 125° C. for 15 minutes.

Comparative Example CE-1A: 10/90 Surface-modified Nanoparticles/MP-1 Nanocomposite The nanodispersion prepared in Step 3A was filtered through a 200 micrometer filter during transfer to a shallow aluminum tray, and allowed to dry at ambient temperature and pressure for a minimum of 3 days. 60 grams of the dried material was melt processed in batch mode using a model D-51 Plasti-corder (C.W. Brabender Instruments, Inc., South Hackensack, NJ) at 75 rpm and 125° C. for 15 minutes.

Comparative Example CE-1B: 20/80 Surface-modified Nanoparticles/MP-1 Nanocomposite The nanodispersion prepared in Step 3B was filtered through a 200 micrometer filter during transfer to a shallow aluminum tray, and allowed to dry at ambient temperature and pressure for a minimum of 3 days. 60 grams of the dried material was melt processed in batch mode using a model D-51 Plasti-corder (C.W. Brabender Instruments, Inc., South Hackensack, NJ) at 75 rpm and 125° C. for 15 minutes.

Comparative Example CE-1C: 30/70 Surface-modified Nanoparticles/MP-1 Nanocomposite The nanodispersion prepared in Step 3C was filtered through a 200 micrometer filter during transfer to a shallow aluminum tray, and allowed to dry at ambient temperature and pressure for a minimum of 3 days. 60 grams of the dried material was melt processed in batch mode using a model D-51 Plasti-corder (C.W. Brabender Instruments, Inc., South Hackensack, NJ) at 75 rpm and 125° C. for 15 minutes.

Comparative Example CE-1D: 40/60 Surface-modified Nanoparticles/MP-1 Nanocomposite The nanodispersion prepared in Step 3D was filtered through a 200 micrometer filter during transfer to a shallow aluminum tray, and allowed to dry at ambient temperature and pressure for a minimum of 3 days. 60 grams of the dried material was melt processed in batch mode using a model D-51 Plasti-corder (C.W. Brabender Instruments, Inc., South Hackensack, NJ) at 75 rpm and 125° C. for 15 minutes.

Comparative Example CE-1E: 50/50 Surface-modified Nanoparticles/MP-1 Nanocomposite The nanodispersion prepared in Step 3E was filtered through a 200 micrometer filter during transfer to a shallow aluminum tray, and allowed to dry at ambient temperature and pressure for a minimum of 3 days. 60 grams of the dried material was melt processed in batch mode using a model D-51 Plasti-corder (C.W. Brabender Instruments, Inc., South Hackensack, NJ) at 75 rpm and 125° C. for 15 minutes.

Comparative Example CE-1F: 60/40 Surface-modified Nanoparticles/MP-1 Nanocomposite The nanodispersion prepared in Step 3F was filtered through a 200 micrometer filter during transfer to a shallow aluminum tray, and allowed to dry at ambient temperature and pressure for a minimum of 3 days. 60 grams of the dried material was melt processed in batch mode using a model D-51 Plasti-corder (C.W. Brabender Instruments, Inc., South Hackensack, NJ) at 75 rpm and 125° C. for 15 minutes.

Preparation of Nanocomposite Films:

Comparative Example CE-2: MP-1 Polymer Film

The copolymer of Comparative Example CE-1 was pressed into film using a model 3856 hot press (Carver Inc., Wabash, IN) operated at 125° C. and 82.7 MPa.

Comparative Examples CE-3-CE-8: Surface-modified Nanoparticles/MP-1 Nanocomposite Films The nanocomposites of Comparative Examples CE-1A-CE-1F were pressed into films using a model 3856 hot press (Carver Inc., Wabash, IN) operated at 125° C. and 82.7 MPa.

The pressed nanocomposite films of Comparative Examples CE-3-CE-8 and unfilled MP-1 film of Comparative Example CE-2 were characterized for thickness, optics, and select mechanical properties of tensile modulus, elongation at break, and pen drop as a measure of impact resistance according to Test Methods described below. The characterization results are shown in Table 2.

The film characterization results in Table 2 show that the unfilled MP-1 film of Comparative Example CE-2 exhibits good optical performance with high transmission and clarity, and low haze, and poor mechanical properties as exhibited by the poor pen drop performance and low tensile modulus. The $SiO_2$/MP-1 nanocomposite films of Comparative Examples CE-3-CE-8 also exhibit good optical performance with high transmission and clarity, and low haze even at very high nanoparticle loading. The optical performance illustrates the effectiveness of the carboxylic acid surface modification of the silica nanoparticles to prevent agglomeration or aggregation of the nanoparticles within the matrix. The mechanical properties of the nanocomposite films are superior to the unfilled polymer with better impact resistance as characterized by pen drop and dramatically higher tensile modulus even at low nanoparticle loading. The elongation at break of the nanocomposite films decreases dramatically with increasing nanoparticle loading. The nanocomposite films of Comparative Examples CE-6-CE-8 exhibited good optical performance and generally good pen drop, but were too brittle to cut properly for tensile testing.

Comparative Examples CE-9-CE-19: (Meth)acrylic Copolymer Films of MP-1-MP-12

The unfilled copolymers and ionomers of Comparative Examples CE-9-CE-19 were melt processed in batch mode using a model D-51 Plasti-corder (C.W. Brabender Instruments, Inc., South Hackensack, NJ) for 10 minutes at 150° C. and 75 rpm. The melt processed material was cooled to room temperature, and then pressed into a film using a model 3856 hot press (Carver Inc., Wabash, IN) operated at 125° C. and 82.7 MPa. The unfilled copolymers and ionomers of Comparative Examples CE-9-CE-19 were characterized for thickness, optics, and select mechanical properties of tensile modulus, elongation at break, and pen drop. The characterization results are shown in Table 3.

TABLE 2

| EX | $SiO_2$/MP-1 Nanocomposite Film[1] (w/w) | $SiO_2$[2] (w %) | Ion | Thickness mil (μm) | T[3] (%) | H[3] (%) | C[3] (%) | Pen Drop (cm) | Tensile Modulus (MPa) | Elongation At Break (%) |
|---|---|---|---|---|---|---|---|---|---|---|
| CE-2 | 0/100 | — | — | 4.2 (107) | 92.9 | 4.0 | 96.7 | <1 | 18.6 | 368.8 |
| CE-3 | 10/90 | 16.63 | Na+ | 6.5 (165) | 93.2 | 3.2 | 96.5 | 1 | 537.1 | 117.3 |
| CE-4 | 20/80 | 24.56 | Na+ | 4.2 (107) | 93.1 | 3.2 | 95.7 | 1 | 703.0 | 13.8 |
| CE-5 | 30/70 | 32.05 | Na+ | 4.7 (119) | 93.0 | 3.6 | 96.6 | 1 | 864.4 | 7.5 |
| CE-6 | 40/60 | 39.69 | Na+ | 4.1 (104) | 92.9 | 3.1 | 98.4 | <1 | brittle[4] | |
| CE-7 | 50/50 | 47.69 | Na+ | 6.7 (170) | 92.3 | 4.5 | 96.7 | 1.5 | brittle | |
| CE-8 | 60/40 | 56.32 | Na+ | 7.0 (178) | 93.1 | 3.9 | 96.9 | 2 | brittle | |

[1]Nominal nanocomposite composition is $SiO_2$ (w %)/MP (w %).
[2]Actual $SiO_2$ concentration in nanocomposite films was determined by TGA and listed in column 3 of Table 2.
[3]T: transmission, H: haze, C: clarity.
[4]Films were too brittle to cut in preparation for tensile testing.

TABLE 3

| EX | Polymer Film | Acid[1] (w %) | Ion | $T_m$[2] (° C.) | Thickness mil (μm) | T[3] (%) | H[3] (%) | C[3] (%) | Pen Drop (cm) | Tensile Modulus (Mpa) | Elongation At Break (%) |
|---|---|---|---|---|---|---|---|---|---|---|---|
| CE-2 | MP-1 | 20.5 | — | 77 | 2.1 (53) | 93.8 | 2.5 | 95.5 | <1 | 17.7 | 312.5 |
| CE-9 | MP-4 | 15 | — | 91 | 3.3 (84) | 93.7 | 2.1 | 97.1 | <1 | 69.0 | 471.5 |
| CE-10 | MP-3 | 11 | — | 94 | 3.7 (94) | 93.4 | 2.7 | 95.6 | <1 | 94.7 | 292.3 |
| CE-11 | MP-2 | 9.7 | — | 98 | 3.7 (94) | 92.8 | 3.1 | 98.4 | <1 | 123.2 | 547.7 |
| CE-12 | MP-5 | proprietary | $Na^+$ | 98 | 6.7 (170) | 92.0 | 3.7 | 95.6 | 1 | 225.2 | 393.6 |
| CE-13 | MP-6 | proprietary | $Zn^{++}$ | 90 | 6.4 (163) | 92.4 | 2.7 | 96.8 | 1 | 210.5 | 308.0 |
| CE-14 | MP-7 | proprietary | $Na^+$ | 92 | 7.3 (185) | 89.2 | 4.1 | 96.9 | 1 | 394.2 | 358.7 |
| CE-15 | MP-8 | proprietary | $Li^+$ | 91 | 7.2 (183) | 92.2 | 2.6 | 97.1 | 1 | 376.5 | 369.1 |
| CE-16 | MP-9 | proprietary | $Zn^+$ | 85 | 6.7 (170) | 92.6 | 3.0 | 96.9 | <1 | 73.8 | 466.2 |
| CE-17 | MP-10 | proprietary | $Zn^{++}$ | 86 | 7.1 (180) | 92.3 | 3.5 | 96.8 | 1 | 265.5 | 355.8 |
| CE-18 | MP-11 | proprietary | $Na^+$ | 88 | 7.2 (183) | 93.0 | 2.0 | 98.6 | 1 | 328.4 | 327.2 |
| CE-19 | MP-12 | proprietary | $Mg^{++}$ | 78 | 3.8 (97) | 90.9 | 6.0 | 97.0 | 1 | 70.8 | 340.8 |

[1]Acid comonomer content in (meth)acrylic acid copolymer on weight basis. Acid comonomer for MP-1 and MP-2 is acrylic acid and for MP-3 and MP-4 is methacrylic acid.
[2]Tm: melting temperature.
[3]T: transmission; H: haze; C: clarity.

All the copolymers and ionomers of Comparative Examples CE-2 and CE-9-CE-19 exhibit high transmission and clarity, and low haze. The pen drop results show that all the un-neutralized copolymers of Comparative Examples CE-2 and CE-9-CE-11 exhibit poor impact resistance. The ionomer of Comparative Example CE-16 which is a terpolymer also exhibits poor impact resistance. The ionomers of Comparative Examples CE-12-CE-15 and CE-17-CE-19, all exhibit better impact resistance compared to the copolymers that are not neutralized. All the ionomers of Comparative Examples CE-12-CE-19 also exhibit higher tensile modulus compared to the un-neutralized copolymers except for two ionomers of terpolymers, Comparative Examples CE-16 and CE-19. The neutralization does not have a significant effect of elongation at break which is high in the case of all unfilled polymers of Comparative Examples CE-9-CE-19.

Comparative Examples CE-20-CE-30: (Meth)acrylic Copolymer Blend Films

The unfilled copolymers and ionomers blends of Comparative Examples CE-20-CE-30 were melt processed in batch mode using a model D-51 Plasti-corder (C.W. Brabender Instruments, Inc., South Hackensack, NJ) for 10 minutes at 150° C. and 75 rpm. The blend composition was 44 weight percent MVP-1 and 56 weight percent the second copolymer or ionomer. In each case, 22 grams of MP-1 and 28 grams of the second copolymer or ionomer was combined in the Plasti-corder. The melt processed blend was cooled to room temperature, and then pressed into a film using a model 3856 hot press (Carver Inc., Wabash, IN) operated at 125C and 82.7 MPa. The unfilled copolymer and ionomer blends of Comparative Examples CE-20-CE-30 were characterized for thickness, optics, and select mechanical properties of tensile modulus, elongation at break, and pen drop. The characterization results are shown in Table 4.

TABLE 4

| EX | MP-1 Blend Film[1] | Ion | Thickness mil (μm) | T[2] (%) | H[2] (%) | C[2] (%) | Pen Drop (cm) | Tensile Modulus (Mpa) | Elongation At Break (%) |
|---|---|---|---|---|---|---|---|---|---|
| CE-20 | MP-4 | $Na^+$ | 5.0 (127) | 92.9 | 3.9 | 96.8 | <1 | 64.6 | 373.1 |
| CE-21 | MP-3 | $Na^+$ | 2.9 (74) | 93.2 | 11.1 | 94.1 | <1 | 100.9 | 292.3 |
| CE-22 | MP-2 | $Na^+$ | 3.3 (84) | 92.6 | 17.9 | 94.9 | <1 | 82.5 | 309.1 |
| CE-23 | MP-5 | $Na^+$ | 3.5 (89) | 93.1 | 13.1 | 97.7 | <1 | 216.0 | 227.6 |
| CE-24 | MP-6 | $Na^+$, Zn | 3.2 (81) | 93.0 | 6.2 | 96.9 | <1 | 116.9 | 212.5 |
| CE-25 | MP-7 | $Na^+$ | 3.5 (89) | 93.0 | 5.6 | 97.1 | <1 | 365.2 | 344.1 |
| CE-26 | MP-8 | $Na^+$, $Li^+$ | 4.7 (119) | 92.2 | 6.4 | 96.9 | <1 | 265.0 | 459.3 |
| CE-27 | MP-9 | $Na^+$, $Zn^{++}$ | 5.1 (130) | 92.9 | 6.0 | 96.7 | <1 | 75.0 | 469.7 |
| CE-28 | MP-10 | $Na^+$, $Zn^{++}$ | 6.5 (165) | 92.4 | 3.1 | 97.1 | <1 | 155.1 | 375.7 |
| CE-29 | MP-11 | $Na^+$ | 5.2 (132) | 92.2 | 8.4 | 96.8 | <1 | 305.1 | 239.1 |
| CE-30 | MP-12 | $Na^+$, Mg ** | 6.5 (165) | 92.4 | 4.1 | 97.1 | <1 | 224.9 | 253.7 |

[1]Blend is 44 weight percent MP-1 copolymer and 56 weight percent copolymer or ionomer of column 2 of Table 4.
[2]Tm: melting temperature.
[4]T: transmission; H: haze; C: clarity.

All the unfilled (meth)acrylic acid copolymer blends of Comparative Examples CE-20-CE-30 exhibit good optical quality with high transmission and clarity, and low haze except CE-21-CE-23. The haze of Comparative Examples CE-21-CE-23 indicates that MP-3 and MP-2 copolymers, and MP-5 ionomer are immiscible with MP-1 copolymer. The low haze of Comparative Example CE-20 indicates that MP-4 is miscible with MP-1 and that miscibility is determined by the difference in acid content of the copolymers. The difference in acid chemistry of the copolymers, that is, between acrylic and methacrylic acids does not impact miscibility. The acid content of the ionomers is considered proprietary by the manufacturer. Fortunately, as shown in Table 3, the melting point ($T_m$) of the copolymers correlates with acid content and $T_m$ is available for all the copolymer and ionomers. Comparative Example CE-23 shows that MP-5 ionomer is immiscible with MP-1 copolymer as indicated by high haze. The high $T_m$ of MP-5 also suggests that it has low acid content relative to MP-1. The ionomers of Comparative Examples CE-24-CE-30 possess low $T_m$ suggesting high acid content and miscibility with the high acid content MP-1 copolymer. The low haze of Comparative Examples CE-24-CE-30 confirm this premise.

The pen drop results for the blends of Comparative Examples CE-20-CE-30 show that the poor impact resistance of MP-1 is imparted to the blends. Likewise, the tensile modulus of the blends with MP-1 is generally lower than pure copolymer or ionomer. The elongation at break for all the blends remains high.

Comparative Examples CE-31-CE-36: MP-1/MP-10 Blend Films

The MP-1/MP-10 copolymer/ionomer blends of Comparative Examples CE-31-CE-36 were melt processed in continuous mode using a ZSE 27 MAXX twin screw extruder (Leistritz, Allendale, NJ) at 175° C. and 150 rpm. Residence time in the extruder is estimated to be less than one minute. The extrudate was collected as "plier samples" at the exit of the extruder and allowed to cool to room temperature. The extrudate was then pressed into film using a model 3856 hot press (Carver Inc., Wabash, IN) operated at 125° C. and 82.7 MPa. The unfilled blends of Comparative Examples CE-31-CE-36 were characterized for thickness, optics, and select mechanical properties of tensile modulus, elongation at break, and pen drop. The characterization results are shown in Table 5.

Example 2: Surface-Modified Nanoparticles/MP-1/MP-3 Nanocomposite Blend 40 grams of the 60/40 Surface-modified nanoparticles/MP-1 nanocomposite of Comparative Example CE-1F was combined with 20 grams of MP-3 copolymer and melt processed in batch mode using a model D-51 Plasti-corder (C.W. Brabender Instruments, Inc., South Hackensack, NJ) at 150° C. and 75 rpm for 15 minutes.

Examples 3: Surface-Modified Nanoparticles/MP-1/MP-2 Nanocomposite Blend 40 grams of the 60/40 Surface-modified nanoparticles/MP-1 nanocomposite of Comparative Example CE-1F was combined with 20 grams of MP-2 copolymer and melt processed in batch mode using a model D-51 Plasti-corder (C.W. Brabender Instruments, Inc., South Hackensack, NJ) at 150° C. and 75 rpm for 15 minutes.

Example 4: Surface-Modified Nanoparticles/MP-1/MP-5 Nanocomposite Blend 40 grams of the 60/40 Surface-modified nanoparticles/MP-1 nanocomposite of Comparative Example CE-1F was combined with 20 grams of MP-5 ionomer and melt processed in batch mode using a model D-51 Plasti-corder (C.W. Brabender Instruments, Inc., South Hackensack, NJ) at 150° C. and 75 rpm for 15 minutes.

TABLE 5

| EX | MP-1/MP-10 Blend Film[1] (w/w) | Ion | Thickness mil (μm) | T[2] (%) | H[2] (%) | C[2] (%) | Pen Drop (cm) | Tensile Modulus (Mpa) | Elongation @ Break (%) |
|---|---|---|---|---|---|---|---|---|---|
| CE-31 | 100/0 | — | 2.7 (69) | 92.8 | 2.4 | 96.6 | <1 | 17.7 | 312.5 |
| CE-32 | 80/20 | Na$^+$, Zn$^{++}$ | 7.8 (198) | 92.6 | 2.7 | 96.8 | <1 | 46.0 | 273.0 |
| CE-33 | 60/40 | Na$^+$, Zn$^{++}$ | 7.8 (198) | 92.9 | 3.2 | 95.0 | <1 | 75.8 | 308.5 |
| CE-34 | 40/60 | Na$^+$, Zn$^{++}$ | 6.3 (160) | 93.0 | 2.6 | 96.9 | <1 | 112.2 | 258.5 |
| CE-35 | 20/80 | Na$^+$, Zn$^{++}$ | 5.7 (145) | 93.0 | 2.4 | 96.8 | <1 | 148.5 | 334.1 |
| CE-36 | 0/100 | Na$^+$, Zn$^{++}$ | 5.1 (130) | 93.8 | 2.1 | 97.1 | 1 | 283.2 | 390.7 |

[1]Blend composition is weight percent MP-1 followed by weight percent MP-10 in column 2 of Table 5.
[2]T: transmission; H: haze; C: clarity.

The optical characterization of Comparative Examples CE-31-CE-36 indicates optical grade quality and miscibility of MP-1/MP-10 ionomer blends over the entire blend composition range. It is noted that the haze is lower when the melt processing is performed in continuous mode relative to batch mode. This is to be expected since in continuous mode of the extruder is self-cleaning while the batch mode of the Plasti-corder requires manual cleaning. The pen drop results show that the low impact resistance of MP-1 dictates the impact resistance of the blend over most of the blend composition. The tensile moduli of the blends correlate with that of the pure copolymer and ionomer. The elongation at break for the blends is consistent with that of the pure copolymer and ionomer.

Example 1: Surface-Modified Nanoparticles/MP-1/MP-4 Nanocomposite Blend 40 grams of the 60/40 Surface-modified nanoparticles/MP-1 nanocomposite of Comparative Example CE-1F was combined with 20 grams of MP-4 copolymer and melt processed in batch mode using a model D-51 Plasti-corder (C.W. Brabender Instruments, Inc., South Hackensack, NJ) at 150° C. and 75 rpm for 15 minutes.

Example 5: Surface-Modified Nanoparticles/MP-1/MP-6 Nanocomposite Blend 40 grams of the 60/40 Surface-modified nanoparticles/MP-1 nanocomposite of Comparative Example CE-1F was combined with 20 grams of MP-6 ionomer and melt processed in batch mode using a model D-51 Plasti-corder (C.W. Brabender Instruments, Inc., South Hackensack, NJ) at 150° C. and 75 rpm for 15 minutes.

Example 6: Surface-Modified Nanoparticles/MP-1/MP-7 Nanocomposite Blend 40 grams of the 60/40 Surface-modified nanoparticles/MP-1 nanocomposite of Comparative Example CE-1F was combined with 20 grams of MP-7 ionomer and melt processed in batch mode using a model D-51 Plasti-corder (C.W. Brabender Instruments, Inc., South Hackensack, NJ) at 150° C. and 75 rpm for 15 minutes.

Example 7: Surface-Modified Nanoparticles/MP-1/MP-8 Nanocomposite Blend 40 grams of the 60/40 Surface-modified nanoparticles/MP-1 nanocomposite of Comparative Example CE-1F was combined with 20 grams of MP-8 ionomer and melt processed in batch mode using a model D-51 Plasti-corder (C.W. Brabender Instruments, Inc., South Hackensack, NJ) at 150° C. and 75 rpm for 15 minutes.

Example 8: Surface-Modified Nanoparticles/MP-1/MP-9 Nanocomposite Blend 40 grams of the 60/40 Surface-modified nanoparticles/MP-1 nanocomposite of Comparative Example CE-1F was combined with 20 grams of MP-9 ionomer and melt processed in batch mode using a model D-51 Plasti-corder (C.W. Brabender Instruments, Inc., South Hackensack, NJ) at 150° C. and 75 rpm for 15 minutes.

Examples 9: Surface-Modified Nanoparticles/MP-1/MP-10 Nanocomposite Blend 40 grams of the 60/40 Surface-modified nanoparticles/MP-1 nanocomposite of Comparative Example CE-1F was combined with 20 grams of MP-10 ionomer and melt processed in batch mode using a model D-51 Plasti-corder (C.W. Brabender Instruments, Inc., South Hackensack, NJ) at 150° C. and 75 rpm for 15 minutes.

Example 10: Surface-Modified Nanoparticles/MP-1/MP-11 Nanocomposite Blend 40 grams of the 60/40 Surface-modified nanoparticles/MP-1 nanocomposite of Comparative Example CE-1F was combined with 20 grams of MP-11 ionomer and melt processed in batch mode using a model D-51 Plasti-corder (C.W. Brabender Instruments, Inc., South Hackensack, NJ) at 150° C. and 75 rpm for 15 minutes.

Example 11: Surface-Modified Nanoparticles/MP-1/MP-12 Nanocomposite Blend 40 grams of the 60/40 Surface-modified nanoparticles/MP-1 nanocomposite of Comparative Example CE-1F was combined with 20 grams of MP-12 ionomer and melt processed in batch mode using a model D-51 Plasti-corder (C.W. Brabender Instruments, Inc., South Hackensack, NJ) at 150° C. and 75 rpm for 15 minutes.

Examples 12-22: Nanocomposite Blend Films

The nanocomposite blends of Examples 1-11 were pressed into films using a model 3856 hot press (Carver Inc., Wabash, IN) operated at 125° C. and 82.7 MPa. The nanocomposite blend films of Examples 12-22 were characterized for thickness, optics, and select mechanical properties of tensile modulus, elongation at break, and pen drop. The characterization results are shown in Table 6.

TABLE 6

| EX | $SiO_2$/MP-1 Nanocomposite Blend Film[1] | $SiO_2$[2] (w %) | Ion | Thickness mil (μm) | $T$[3] (%) | $H$[3] (%) | $C$[3] (%) | Pen Drop (cm) | Tensile Modulus (Mpa) | Elongation At Break (%) |
|---|---|---|---|---|---|---|---|---|---|---|
| 12 | MP-4 | 36.72 | $Na^+$ | 4.8 (122) | 92.2 | 8.3 | 91.0 | 1 | 746.0 | 9.0 |
| 13 | MP-3 | 37.10 | $Na^+$ | 3.4 (86) | 90.4 | 23.5 | 87.4 | 1 | 775.4 | 3.1 |
| 14 | MP-2 | 36.99 | $Na^+$ | 5.2 (132) | 88.8 | 29.4 | 87.8 | 1 | 778.9 | 17.4 |
| 15 | MP-5 | 37.28 | $Na^+$ | 4.5 (114) | 90.7 | 25.6 | 89.9 | 1 | 913.3 | 1.9 |
| 16 | MP-6 | 38.49 | $Na^+$, $Zn^{++}$ | 6.5 (165) | 92.8 | 8.2 | 91.6 | 2.5 | 669.7 | 13.5 |
| 17 | MP-7 | 37.72 | $Na^+$ | 5.8 (147) | 91.6 | 8.4 | 94.0 | 1 | 770.8 | 4.9 |
| 18 | MP-8 | 37.13 | $Na^+$, $Li^+$ | 5.6 (142) | 91.6 | 7.5 | 93.7 | 1.5 | 717.7 | 6.4 |
| 19 | MP-9 | 37.20 | $Na^+$, $Zn^{++}$ | 4.4 (112) | 91.9 | 6.3 | 93.3 | <1 | 459.8 | 33.7 |
| 20 | MP-10 | 38.38 | $Na^+$, $Zn^{++}$ | 5.7 (145) | 92.4 | 5.0 | 93.7 | 2 | 720.2 | 7.2 |
| 21 | MP-11 | 37.33 | $Na^+$ | 4.4 (112) | 91.8 | 8.4 | 93.5 | <1 | 840.0 | 3.0 |
| 22 | MP-12 | 37.45 | $Na^+$, $Mg^{++}$ | 4.8 (122) | 91.8 | 6.3 | 93.9 | 1 | 520.9 | 10.4 |

[1]Nominal nanocomposite blend composition is 40 w % $SiO_2$, 27 w % MP-1, and 33 w % polymer or ionomer in column 2 of Table 6. Stated another way, nominal nanocomposite blend composition is 40 w % $SiO_2$ in a 44/56 w/w blend of MP-1 and copolymer or ionomer in column 2 of Table 6.
[2]Actual $SiO_2$ concentration in nanocomposite blend was determined by TGA and listed in column 5 of Table 6.
[3]T: transmission, H: haze, C: clarity.

All the nanocomposite blends except Examples 13-15 exhibit high transmission and clarity, and low haze. The high haze of Examples 13-15 is attributed to the immiscibility of the two polymers of the nanocomposite blend as explained in reference to Comparative Examples CE-14-CE-16. The pen drop results show that most of the nanocomposite blends exhibit improved impact resistance relative to the pure copolymer, ionomer, or their blends with MP-1. The improved impact resistance is attributed to the nanoparticles. Comparative Examples CE-6-CE-8 showed that while nanoparticles improved the impact resistance, the nanoparticles also increase brittleness of the nanocomposite at high loading. The results for the nanocomposite blends of Examples 12-22 illustrate how blending coupled with nanoparticles results in nanocomposite blends with improved impact resistance without brittleness. The nanocomposite blends of Examples 12-22 have the same nanoparticle loading as Comparative Example CE-6 and yet are not brittle. This result illustrates the complementary benefits of polymer blends and polymer nanocomposites in development of new flexible optical materials.

Test Methods
Nuclear Magnetic Resonance (NMR)

Synthesized carboxylic acid silane chemistry was confirmed using a Bruker Avance 600 MHz NMR spectrometer equipped with a cryogenically cooled probe head (Bruker Corporation, Billerica, MA). The carboxylic acid silane/DMF solution was mixed with deuterated DMF. One dimensional (1D) $^1H$ and $^{13}C$ NMR data were collected at 25° C. One of the residual proto-solvent resonances was used as a secondary chemical shift reference in the proton dimension (δ=8.03 ppm).

Thermal Gravimetric Analysis (TGA)

Nanoparticle concentration in the nanocomposite films and nanocomposite blend films was measured by TGA. A model TGA Q500 (TA Instruments, New Castle, DE) was used. Approximately, a 5 milligram sample of nanocomposite film or nanocomposite blend film was placed on a platinum pan that was previously tared by the instrument. The nanoparticle concentration was determined as the final weight on the sample after heating from room temperature to 700° C. at 20° C./min.

Film Thickness

Film thickness was measured using a digital indicator model H0530E (Mitutoyo America Corporation, Aurora, IL).

Transmission, Haze, and Clarity (THC)

Luminous transmission, haze, and clarity were measured according to ASTM D1003-00 using a model 4725 Gardner Haze-Guard Plus (BYK-Gardner, Columbia, MD)

Pen Drop

Pen drop was measured using a plastic graduated cylinder and 4.5 gram ball point pen. The pen was loaded in the cylinder at a test height, and then the pen was dropped onto the film being tested. The maximum height which did not leave an impact defect from the pen hitting the film was recorded as pen drop height. It is noted that the minimum height of graduation on the cylinder is 1 centimeter, so films failing at 1 cm were labeled "<1 cm."

Tensile Modulus

Tensile modulus was measured using a model 5965 mechanical property testing unit (Instron, Norwood, MA). A 3 inch (7.6 cm) length by 1 inch (2.54 cm) width by measured thickness of film was loaded between clamps of the unit. The film was not tapered. The film was stretched at a strain rate of 0.5 inches per minute (1.3 cm/min).

The tensile modulus was recorded as slope of stress versus strain using the 2% offset method.

Elongation At Break

Elongation at break was measured using a model 5965 mechanical property testing unit (Instron, Norwood, MA). A 3 inch (7.6 cm) length by 1 inch (2.54 cm) width measured thickness of film was loaded between clamps of the unit. The film was not tapered. The film was stretched at a strain rate of 0.5 inches per minute (1.3 cm/min). The percentage increase in strained film length when the film broke was recorded at elongation at break.

Although specific embodiments have been illustrated and described herein for purposes of description, it will be appreciated by those of ordinary skill in the art that a wide variety of alternate and/or equivalent implementations may be substituted for the specific embodiments shown and described without departing from the scope of the present disclosure. This application is intended to cover any adaptations or variations of the desirable embodiments discussed herein. Therefore, it is manifestly intended that this disclosure be limited only by the claims and the equivalents thereof.

What is claimed is:

1. A nanocomposite blend comprising:
a first (meth)acrylic polymer or copolymer comprised of monomers selected from the group consisting of methacrylic acid and acrylic acid;
a second (meth)acrylic polymer or copolymer comprised of monomers selected from the group consisting of methacrylic acid and acrylic acid; and
surface-modified metal oxide nanoparticles, wherein the surface-modified metal oxide nanoparticles are surface modified with a surface modifying agent comprising a carboxylic acid silane of Formula 1:

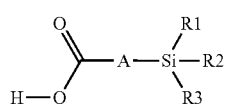

Formula 1 wherein
R1 is a $C_1$ to $C_{10}$ alkoxy group; and
R2 and R3 are independently selected from the group consisting of $C_1$ to $C_{10}$ alkyl and $C_1$ to $C_{10}$ alkoxy groups; and
A is a linker group selected from the group consisting of $C_1$ to $C_{10}$ alkylene or arylene groups, $C_1$ to $C_{10}$ aralkylene groups, $C_2$ to $C_{16}$ heteroalkylene or heteroarylene groups, and $C_2$ to $C_{16}$ amide containing groups.

2. The nanocomposite blend of claim 1, wherein the first and the second (meth)acrylic polymer or copolymer each comprises a copolymer comprising at least one additional monomer selected from the group consisting of ethylene, propylene, alkyl(meth)acrylates, aryl(meth)acrylates, alkaryl(meth)acrylates, acrylonitrile, and carbon monoxide.

3. The nanocomposite blend of claim 2, wherein the first and the second (meth)acrylic polymer are at least partially neutralized with sodium cations, calcium cations, potassium cations, zinc cations, lithium cations, magnesium cations, aluminum cations, or a combination thereof.

4. The nanocomposite blend of claim 2, wherein the (meth)acrylic monomer in the first and the second copolymer is present in an amount of at least 14% by weight.

5. The nanocomposite blend of claim 4, wherein the difference in (meth)acrylic acid monomer in the first and the second copolymer is less than 6% by weight.

6. The nanocomposite blend of claim 1, wherein the concentration of the surface-modified metal oxide nanoparticles is 1 to 70% by weight.

7. The nanocomposite blend of claim 1, wherein the surface-modified metal oxide nanoparticles have an average diameter of from 4 nanometers to 100 nanometers.

8. The nanocomposite blend of claim 1, wherein the surface-modified metal oxide nanoparticles comprise surface-modified nanoparticles of a metal oxide of silicon, titanium, aluminum, hafnium, zinc, tin, cerium, yttrium, indium, antimony, or mixed metal oxides thereof.

9. The nanocomposite blend of claim 8, wherein the surface-modified metal oxide nanoparticles comprise surface-modified silica particles.

10. The nanocomposite blend of claim 2, wherein in at least one of the first and second copolymers the additional monomer comprises ethylene or propylene.

11. The nanocomposite blend of claim 10, wherein at least one of the first and second copolymers further comprises at least one third monomer selected from the group consisting of n-butyl acrylate, isobutyl acrylate, isopropyl acrylate, n-propyl acrylate, ethyl acrylate, methyl acrylate, 2-ethylhexyl acrylate, iso-octyl acrylate and methyl methacrylate.

12. An optical film article comprising:
at least one layer of a polymer nanocomposite blend, wherein the polymer nanocomposite blend comprises:
a first (meth)acrylic polymer or copolymer comprised of monomers selected from the group consisting of methacrylic acid and acrylic acid;

a second (meth)acrylic polymer or copolymer comprised of monomers selected from the group consisting of methacrylic acid and acrylic acid; and
surface-modified metal oxide nanoparticles, wherein the surface-modified metal oxide nanoparticles are surface modified with a surface modifying agent comprising a carboxylic acid silane of Formula 1:

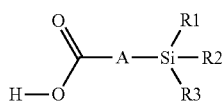

Formula 1 wherein
R1 is a $C_1$ to $C_{10}$ alkoxy group; and
R2 and R3 are independently selected from the group consisting of $C_1$ to $C_{10}$ alkyl and $C_1$ to $C_{10}$ alkoxy groups; and
A is a linker group selected from the group consisting of $C_1$ to $C_{10}$ alkylene or arylene groups, $C_1$ to $C_{10}$ aralkylene groups, $C_2$ to $C_{16}$ heteroalkylene or heteroarylene groups, and $C_2$ to $C_{16}$ amide containing groups.

13. The optical film article of claim 12, wherein the optical film article is flexible, bendable, rollable, foldable, or formable.

14. The optical film article of claim 12, wherein the optical film article is a multi-layer optical film article.

15. The optical film article of claim 14, wherein in the multi-layer optical film article further comprises at least one additional layer comprising a transparent functional coating layer, a transparent adhesive layer, and one or more removable layers.

16. The optical film article of claim 15, wherein the transparent functional coating comprises a hardcoat layer, a conductive layer, a barrier layer, microstructure layer, a slip agent layer, an anti-glare layer, an anti-reflective layer, an anti-fingerprint layer, or an anti-sparkle layer.

17. The optical film article of claim 12, wherein the optical film article is optically transparent.

18. An optical article comprising:
a display device; and
an optical film article in contact with a surface of the display device, wherein the optical film article comprises a flexible, bendable, rollable, foldable, or formable optical film comprising at least one layer of a polymer nanocomposite blend, wherein the polymer nanocomposite blend comprises:
a first (meth)acrylic polymer or copolymer comprised of monomers selected from the group consisting of methacrylic acid and acrylic acid;
a second (meth)acrylic polymer or copolymer comprised of monomers selected from the group consisting of methacrylic acid and acrylic acid; and
surface-modified metal oxide nanoparticles, wherein the surface-modified metal oxide nanoparticles are surface modified with a surface modifying agent comprising a carboxylic acid silane of Formula 1:

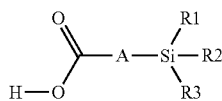

Formula 1 wherein
R1 is a $C_1$ to $C_{10}$ alkoxy group; and
R2 and R3 are independently selected from the group consisting of $C_1$ to $C_{10}$ alkyl and $C_1$ to $C_{10}$ alkoxy groups; and
A is a linker group selected from the group consisting of $C_1$ to $C_{10}$ alkylene or arylene groups, $C_1$ to $C_{10}$ aralkylene groups, $C_2$ to $C_{16}$ heteroalkylene or heteroarylene groups, and $C_2$ to $C_{16}$ amide containing groups.

19. A method of preparing an optical article comprising:
preparing a nanocomposite blend, wherein preparing a nanocomposite blend comprises:
(a) preparing of an aqueous nanodispersion of surface-modified metal oxide nanoparticles, wherein the surface of the metal oxide nanoparticles are modified with a carboxylic acid silane surface modifying agent;
(b) preparing of an aqueous dispersion of a first (meth)acrylic polymer or copolymer wherein the (meth)acrylic polymer or copolymer is at least partially neutralized;
(c) combining the dispersions of (a) and (b) to form an aqueous nanodispersion of surface-modified metal oxide nanoparticles and first (meth)acrylic polymer or copolymer;
(d) drying and/or concentrating the nanodispersion of (c); and
(e) melt processing the dried and/or concentrated nanodispersion (d) and second (meth)acrylic polymer or copolymer to form a nanocomposite blend of surface-modified metal oxide nanoparticles and (meth)acrylic polymers or copolymers, wherein the surface of the metal oxide nanoparticles is modified with a carboxylic acid silane surface modifying agent, and the (meth)acrylic polymers or copolymers are at least partially neutralized.

20. A method of preparing an optical article comprising:
preparing a nanocomposite blend, wherein preparing a nanocomposite blend comprises:
(a) preparing of an aqueous nanodispersion of surface-modified metal oxide nanoparticles, wherein the surface of the metal oxide nanoparticles are modified with a carboxylic acid silane surface modifying agent;
(b) preparing of an aqueous dispersion of first and second (meth)acrylic polymers or copolymers wherein the first and second (meth)acrylic polymers or copolymers are at least partially neutralized;
(c) combining the dispersions of (a) and (b) to form an aqueous nanodispersion of surface-modified metal oxide nanoparticles and first and second (meth)acrylic polymers or copolymers;
(d) drying and/or concentrating the nanodispersion of (c); and
(e) melt processing the dried and/or concentrated nanodispersion (d) to form a nanocomposite blend of surface-modified metal oxide nanoparticles and first and second (meth)acrylic polymers or copolymers, wherein the surface of the metal oxide nanoparticles is modified with a carboxylic acid silane surface modifying agent, and the first and second (meth)acrylic polymers or copolymers are at least partially neutralized.

* * * * *